(12) United States Patent
McKenzie et al.

(10) Patent No.: US 6,220,587 B1
(45) Date of Patent: Apr. 24, 2001

(54) VIBRATION DAMPENING ASSEMBLY

(75) Inventors: Thomas A. McKenzie, Spring Lake; Richard L. Conaway, Grand Haven, both of MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/182,907

(22) Filed: Oct. 30, 1998

Related U.S. Application Data

(63) Continuation-in-part of application No. PCT/US98/04457, filed on Mar. 6, 1998.
(60) Provisional application No. 60/047,467, filed on May 23, 1997, and provisional application No. 60/040,338, filed on Mar. 7, 1997.

(51) Int. Cl.$^7$ .................................................. B60G 11/32
(52) U.S. Cl. ........................................... 267/256; 267/259
(58) Field of Search ............................. 267/256, 136, 267/131, 228, 217, 218, 64.16, 64.27, 64.28, 64.25, 113, 117, 118, 259; 188/129, 381, 378; 180/89.12, 89.13, 89.14, 89.15, 89.16, 89.18, 89.19; 280/124.128, 124.125; 248/564, 585, 586, 588, 589

(56) References Cited

U.S. PATENT DOCUMENTS

| | | | |
|---|---|---|---|
| 3,716,213 | * | 2/1973 | Lacey .................................... 248/564 |
| 3,794,344 | * | 2/1974 | Raidel ............................... 267/256 X |
| 3,797,798 | * | 3/1974 | Magruder et al. ............... 248/585 X |
| 3,966,223 | * | 6/1976 | Carr ............................... 280/124.128 |
| 4,401,179 | * | 8/1983 | Anderson ......................... 180/89.14 |
| 4,735,272 | * | 4/1988 | Sjostrom et al. ............... 180/89.14 |
| 5,253,853 | | 10/1993 | Conaway et al. . |
| 5,651,585 | * | 7/1997 | Van Duser ...................... 248/585 X |

FOREIGN PATENT DOCUMENTS

| | | | |
|---|---|---|---|
| 1806380 | * | 6/1970 | (DE) . |
| 40 15 011 C1 | | 7/1991 | (DE) . |

* cited by examiner

*Primary Examiner*—Matthew C. Graham
*Assistant Examiner*—Melanie Talavera
(74) *Attorney, Agent, or Firm*—Rader, Fishman, Grauer & Mc Garry, An Office of Rader, Fishman & Grauer PLLC

(57) ABSTRACT

A vibration dampening assembly and a suspension system for use, for example, between a cab and a flame of a truck, has a link with a first end pivotably interconnected with a second plate at a first support pivot, a lever with a first end pivotably interconnected with the second end of the link at a link pivot, a shock absorber, the first end of which is pivotably interconnected with the lever second end at a shock pivot and the second end of which is pivotably interconnected to a first or the second plate at a second pivot support spaced from the first support pivot wherein the lever is pivotably interconnected with the first plate at a main pivot connection located intermediate the first and second ends thereof. In one embodiment, the shock absorber central axis and the lever longitudinal axis are parallel when the supporting body and the suspended body are in a static condition. In another embodiment, a third plate is interconnected the second plate at a first lever pivot and the first plate is pivotably interconnected with the second plate at a second lever pivot laterally spaced from the first pivot support, and the first lever pivot is intermediate the first support pivot and the second lever pivot. In another embodiment, a second lever is interconnected to the first plate at a first lever pivot, the second plate and the second lever are interconnected at a second lever pivot spaced laterally from the first lever pivot and the first lever pivot is intermediate the link pivot and the second lever pivot. In another embodiment, an air spring is mounted between two of the plates or between a plate and a lever which are pivotably connected together to cushion the movement of one of the plates toward the other of the plates and to form a suspension.

15 Claims, 15 Drawing Sheets

VIBRATION DAMPENING ASSEMBLY

CROSS-REFERENCE TO RELATED APPLICATIONS

This application is a continuation-in-part of International Application No. PCT/US98/04457, filed Mar. 6, 1998, which claims the benefit of U.S. Provisional Application Ser. No. 60/040,338, filed Mar. 7, 1997, and U.S. Provisional Application Ser. No. 60/047,467, filed May 23, 1997.

BACKGROUND OF THE INVENTION

1. Field of the Invention

This invention relates to a vibration dampening assembly. In one of its aspects, the invention relates to a vibration dampening assembly for use in a suspension system in a vehicle and, in particular, in a suspension system between a cab and a frame of a truck. In another of its aspects, the invention relates to a suspension system for use, for example, between a cab and a frame of a truck.

2. State of the Prior Art

In Conaway et al. U.S. Pat. No. 5,253,853, a vibration dampening device is disclosed for use between a truck body and a cab. The vibration dampening device includes a link pivotably mounted at one end to the frame of a truck and pivotably mounted at another end to a lever. The lever is pivotably mounted at one end to a suspended member, for example, a cab of a truck and is pivotably mounted at another end to one end of a shock absorber. The other end of the shock absorber is pivotably mounted also to the suspended body or cab at a pivot point spaced from the pivot point mounting of the lever first end to the suspended body. This device is said to isolate a suspended body or truck cab from the force vibration of the supporting body and provide a non-linear response to vibrational movement of the suspended body with respect to the support body. Whereas some beneficial vibration isolation takes place with a device according to the Conaway et al. '853 patent, there are some operational limitations in the design of a suitable dampening assembly and there are practical difficulties in manufacturing this vibration dampening device with proper design characteristics. The distance between the axes of pivot mounts of the lever to the suspended body (main pivot) and the lever to the link controls the relative amount of vertical movement between the suspended and supporting bodies and influences the displacement versus resistive force characteristics of the device. It has been found that the axes of these two pivots should be spaced about ⅜" apart. Greater spacing between these two pivot axes gives a wider range of uncontrolled oscillation, and results in a fairly abrupt transition between the oscillation force and dampening force. A smooth transition between the oscillation and the dampening portion of the force versus displacement curve is necessary for an acceptable dampening device. However, at ⅜" spacing between the pivot axes, manufacture of the dampening device becomes difficult because the bearings of the pivot axes overlap. However, the geometry of the device precludes this type of arrangement.

SUMMARY OF THE INVENTION

According to the invention, a vibration dampening assembly for isolating a suspended body from the force vibrations of a supporting body comprises an impact plate adapted to be mounted to the suspended body or the supporting body, a support plate adapted for mounting to the other of the suspended body or supporting body, a link having first and second ends, the link first end pivotably interconnected with the support plate at a first support pivot and a lever having a longitudinal axis and first and second ends. The first end of the lever is pivotably interconnected with the link member second end at a link pivot. A shock absorber, preferably hydraulic, has a central axis and first and second ends. The first end of the shock absorber is pivotably interconnected with the lever member second end at a shock pivot and the second end of the shock absorber is pivotably interconnected with the support plate or the impact plate at a second support pivot spaced from the first support pivot. The lever member is pivotably interconnected with the impact plate at a main pivot connection located intermediate the first and second ends of the longitudinal axis of the lever member. By this arrangement, the configuration is easily manufacturable and the vibration isolation is enhanced significantly.

In a preferred embodiment, the shock absorber central axis and the lever member longitudinal axis are parallel when the supporting body and the suspended body are in a static or design height condition. Further, the main pivot also lies on the lever member longitudinal axis. Preferably, the second support pivot and the link pivot also lie on the lever member longitudinal axis.

In one embodiment of the invention, a second lever member is interconnected to the support plate at a first lever pivot and the impact plate is pivotably interconnected with the second lever member at a second lever pivot laterally spaced from the first pivot support, and the first lever pivot is intermediate the first support pivot and the second lever support. In this embodiment, the second lever functions as a lever, pivotably mounted to the second lever pivot at one end, and an air spring can be mounted between another end of the support plate and the impact plate.

In another embodiment of the invention, a second lever member is interconnected with the impact plate at a first lever pivot, the second lever member and the impact plate are interconnected at a second lever pivot spaced laterally from the first lever pivot, and the first lever pivot is intermediate the link pivot and the second lever pivot. In this embodiment, the second lever member forms a secondary lever and an air spring can be mounted between the impact plate and the second lever member.

In one embodiment, a cross member extends from the support plate toward the impact plate and the shock absorber second end and the link first end pivots are interconnected with the cross member.

Still further according to the invention, a suspension system for supporting a suspended body on a supporting body comprises a first plate adapted for mounting to one of the suspended body or the supporting body and a second plate adapted for mounting to the other of the suspended body and supporting plate. A link member has first and second ends, the first end of which is pivotably interconnected with the second plate at a first support pivot. A first lever member has a longitudinal axis and first and second ends. The first end of the first lever member is pivotably interconnected with the link member second end at a link pivot. A shock absorber has a central axis and first and second ends. The first end of the shock absorber is pivotably interconnected with the first lever member second end at a shock pivot and the second end of the shock absorber is pivotably interconnected with the first or second plate at a second support pivot spaced laterally from the first support pivot. A second lever member is pivotably interconnected with the second plate at one end at a first lever point and pivotably interconnected with the first plate at a second lever pivot spaced from the first lever pivot. An air spring is mounted at one end to the second plate and at another end to the second lever member at a second end thereof. The first lever member is pivotably interconnected with the second lever member at a main pivot connection located intermediate the first and second ends of the first lever member.

In one embodiment, the shock absorber central axis and the first lever member longitudinal axis are parallel when the supporting body and suspended body are in a static condition or at design height. Preferably, the main pivot connection also lies on the lever member longitudinal axis when the supporting body and the suspended body are in a static condition or at design height. Further, the second support pivot and the link pivot also lie on the lever member longitudinal axis when the supporting body and the suspended body are in the static condition or at design height.

Preferably, the air spring has an axis of movement which is transverse to the vertical. In one embodiment, the axis of movement of the air spring is about 45° to the vertical.

Preferably, the main pivot connection is located on the second lever member intermediate the second end and the second lever point.

Still further according to the invention, a suspension system for supporting a suspended body on a supporting body comprises a first plate adapted for mounting to one of the suspended body or the supporting body and a second plate adapted for mounting to the other of the suspended body or the supporting body. A first lever member having a longitudinal axis and first and second ends is pivotably interconnected at a first end with the second plate at a first support pivot. A shock absorber having a central axis and first and second ends is pivotably interconnected with the first lever member second end at a shock pivot and is pivotably interconnected with the second plate at a second support pivot spaced from the first lever pivot. A second lever member is pivotably interconnected with the first plate at a first lever pivot and pivotably interconnected with the second plate at a second lever pivot spaced from the first lever pivot. A link member having first and second ends is pivotably interconnected at the first end with the second lever member at a link support pivot and is pivotably interconnected to the first lever member at the second end intermediate the first support pivot and the shock pivot.

In a preferred embodiment, an air spring is mounted at one end to the second support member and at another end to the second lever member at a distance spaced from the first lever pivot. Preferably, the first lever pivot is positioned on the second lever member intermediate the second lever pivot and the link support pivot.

Still further according to the invention, a suspension system for supporting a suspended body on a supporting body comprises a first plate adapted for mounting to one of the suspended body or the supporting body and a second plate adapted for mounting to the other of the suspended body or supporting body. A link member having first and second ends has a first end pivotably interconnected with the first plate at a link support pivot. A first lever member, having a longitudinal axis and first and second ends, has a first end pivotably interconnected with a second lever member at a first support pivot. The second lever member pivotably interconnects with the first plate at a first lever pivot and pivotably interconnects with the second plate at a second lever pivot laterally spaced from the first lever pivot. A shock absorber having a central axis and first and second ends has a first end pivotably interconnected with the first lever member second end at a shock pivot and a second end pivotably interconnected with the first plate or second plate at a second support pivot spaced laterally from the link support pivot. The link member is pivotably interconnected to the first lever member intermediate the first support pivot and the shock pivot.

In one embodiment, an air spring is mounted between the first plate and the second lever. Preferably, the first support pivot and the second lever pivot are intermediate the air spring and the first lever pivot.

The invention provides a vibration dampening assembly which exhibits a relatively wide range of oscillation around static condition (design height) yet provides a smooth transition to the more forceful dampening from the shock absorbers. The distance between the main pivot and lever/link pivot axes is up to ¾" which is sufficient to accommodate manufacturing considerations.

BRIEF DESCRIPTION OF THE DRAWINGS

The invention will now be described with reference to the accompanying drawings in which.

DESCRIPTION OF THE PREFERRED EMBODIMENTS

Figure 1:
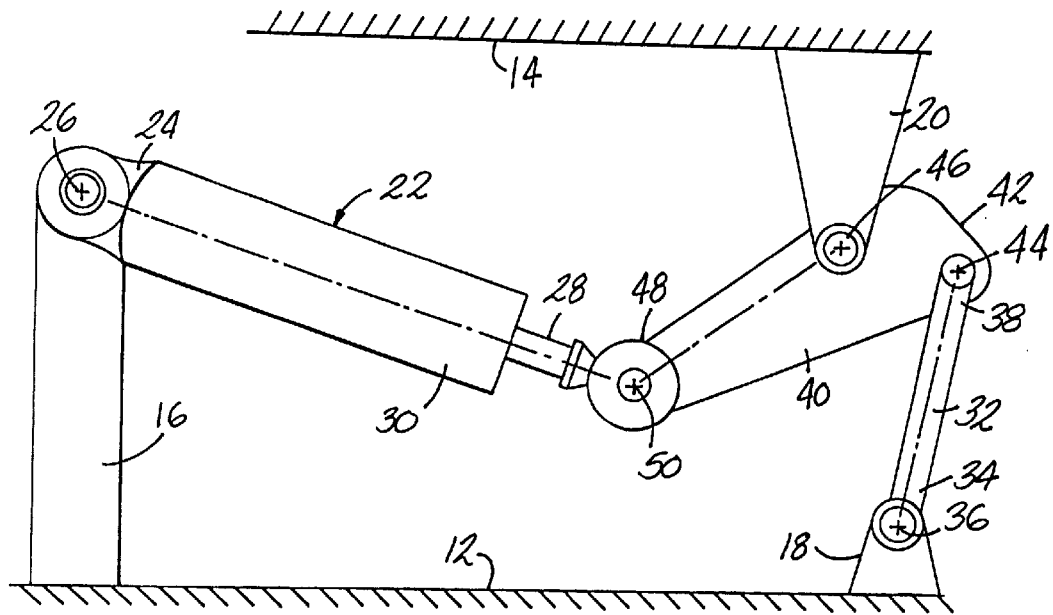
FIG. 1 schematically illustrates a vibration dampening assembly according to the invention.

Referring now to FIG. 1, there is shown a vibration dampening assembly according to the invention for dampening vibration or movement between a support plate and an impact plate 14. This form of the invention is an "extension differential opposite configuration." A support plate can, for example, be a frame of a truck and the impact plate 14 can, for example, be a cab of a truck body. The vibration dampening assembly according to the invention is intended to be used in a manner similar to the suspension vibration dampening device illustrated in U.S. Pat. No. 5,253,853 wherein a suspension system is used between the impact plate 14 and the support plate 12. A suitable suspension system is disclosed in U.S. Pat. No. 5,253,853 which is incorporated herein by reference.

In the vibration dampening assembly illustrated in FIG. 1, a pivot support 16 and a pivot support 18 are mounted to the support plate 12. In like manner, a pivot support 20 is mounted to the impact plate 14. A hydraulic shock absorber 22 is pivotably mounted at one end 24 to the pivot support 16 through a pivot pin 26. The shock absorber 22 has a resistance rod 28 which telescopes within a cylindrical housing 30 in conventional fashion. The movement of the resistance rod into and out of the cylindrical housing 30 is resisted in conventional fashion in a linear manner proportional to the rate at which the resistance rod 28 moves with respect to the cylindrical housing.

A link member 32 is pivotably mounted at a first end 34 to the pivot support 18 through a pivot pin 36. A lever member 40 has a first end 42 and a second end 48. The lever member 40 is pivotably mounted at the first end 42 to a second end 38 of the link member 32 through a link pivot pin 44. The lever member 40 is further pivotably mounted to the pivot support 20 through a main pivot pin 46 at an intermediate point between the ends 42 and 48 of the lever member 40. The lever member 40 is further pivotably mounted to a free end of the resistance rod 28 through a shock pivot pin 50. As illustrated in FIG. 1, the main pivot pin 46 is positioned on the lever member 40 intermediate the link pivot pin 44 and the shock pivot pin 50.

The elements of the embodiment of FIG. 1 are shown for purposes of illustration in a position in which the impact plate and the support plate are in a rest or design height position. The embodiment in FIG. 1 represents the most general physical configuration or arrangement. In this situation, the applied damping force versus vertical motion relationship will be highly unsymmetrical for motions about the static position shown. The response of the vibration dampening assembly shown in FIG. 1 will be asymmetrical for jounce and rebound (movement of the impact plate toward and away from the support plate) if the design height is as shown in FIG. 1. If it is desirable for the vibration mounting assembly to exhibit a symmetrical response for jounce and rebound, then the design height (static position) is selected so that the longitudinal axis of the shock absorber is aligned with the axis between the pivot axes of the main pivot pin 46 and the shock pivot pin 50.

In operation of the vibration dampening assembly illustrated in FIG. 1, as the impact plate moves with respect to the support plate, the shock absorber 22 will rotate about the pivot pin 26. The resistance rod 28 telescopes in and out of the cylindrical housing 30 as the shock absorber 22 rotates about the pivot pin 26. At the same time, the lever member 40 rotates about main pivot pin 46 and link member 32 rotates about pivot pin 36. However, the relationship between the movement of the resistance rod within the cylindrical housing 30 is not linear in relation to the displacement of the impact plate 14 with respect to the support plate 12. Relatively small oscillations around the neutral axis (alignment of longitudinal axis of the shock absorber with the pivot axis of the main pivot pin and the shock pivot pin) produce relatively little movement of the shock absorber resistance rod with respect to the cylindrical housing 30 and thus little resistance to oscillations. However, as the displacement between the support plate and the impact plate becomes greater, the resistance rod moves a greater extent with respect to the cylindrical housing 30 and thereby generates a larger reactive force. In the embodiment disclosed in FIG. 1, the transition between the free oscillation range and the resistance range is gradual.

The configuration illustrated in FIG. 1 achieves the desirable performance characteristics with a spacing between the axes of the main pivot pin 46 and the link/lever pivot pin 44 of about ¾". With this degree of spacing between these pivot axes, there is no overlap between the pivot bearings for each of these pivots. Thus, manufacturing of the dampening assembly is not hindered by the proximity of the main pivot pin 46 and the lever/link pivot pin 44 in lever member 40.

Figure 2:
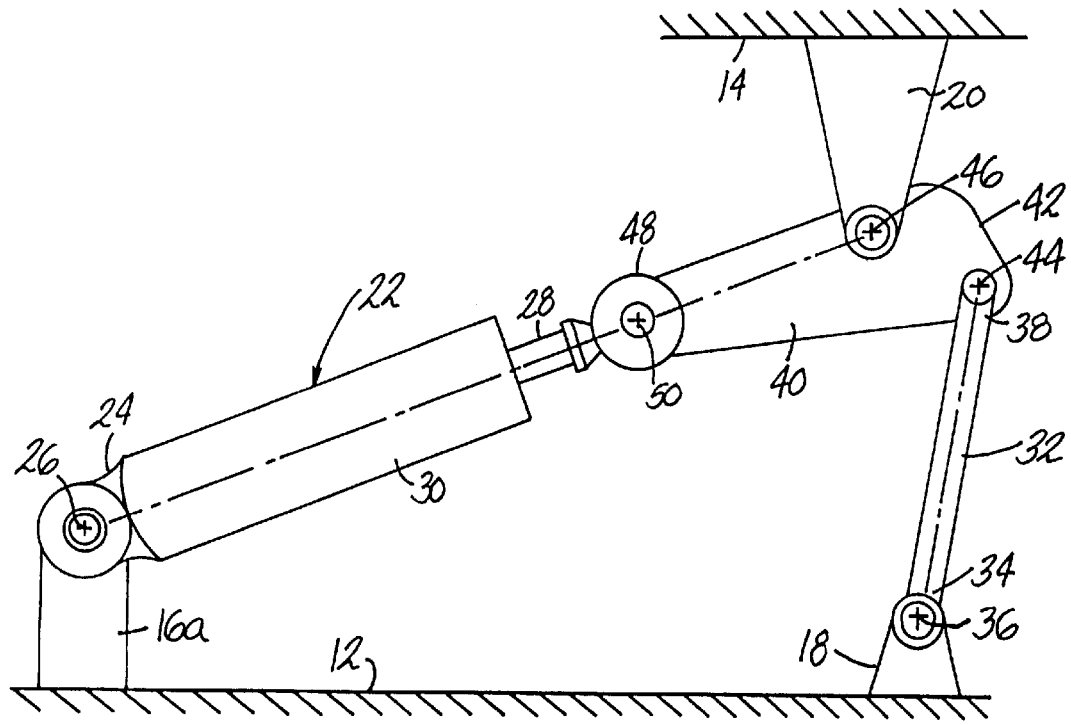
FIG. 2 shows a second embodiment of a vibration dampening assembly according to the invention.

Referring now to FIG. 2, there is shown a second embodiment of the invention wherein like numerals have been used to designate like parts. A support plate 12 has a pivot support 16a and a pivot support 18. The pivot support 16a pivotably mounts one end 24 of a shock absorber 22 through a pivot pin 26. A link member 32 is pivotably mounted to the pivot support 18 at a first end 34 through pivot pin 36. A lever member 40 is mounted at a first end 42 to a second end 38 of the link member 32 through link pivot 44. The lever member 40 is mounted to an impact plate pivot support 20 through a main pivot pin 46 at an intermediate position between the first end 42 and the second end 48 of the lever member 40. The free end of the resistance rod 28 is pivotably mounted to the lever member 40 at the second end 48 through the shock pivot pin 50.

As illustrated in FIG. 2, the axis of pivot pin 26, the axis of shock pivot 50 and the axis of main pivot 46 lie in a common plane and intersect a common line perpendicular to the three axes. In FIG. 2, the elements of the dampening system are represented in a static or design height condition. The operation of the vibration dampening assembly of FIG. 2 operates in substantially the same manner as the operation of the vibration dampening assembly illustrated in FIG. 1 except that a much more symmetric damping resistance versus displacement curve is realized.

Figure 3:
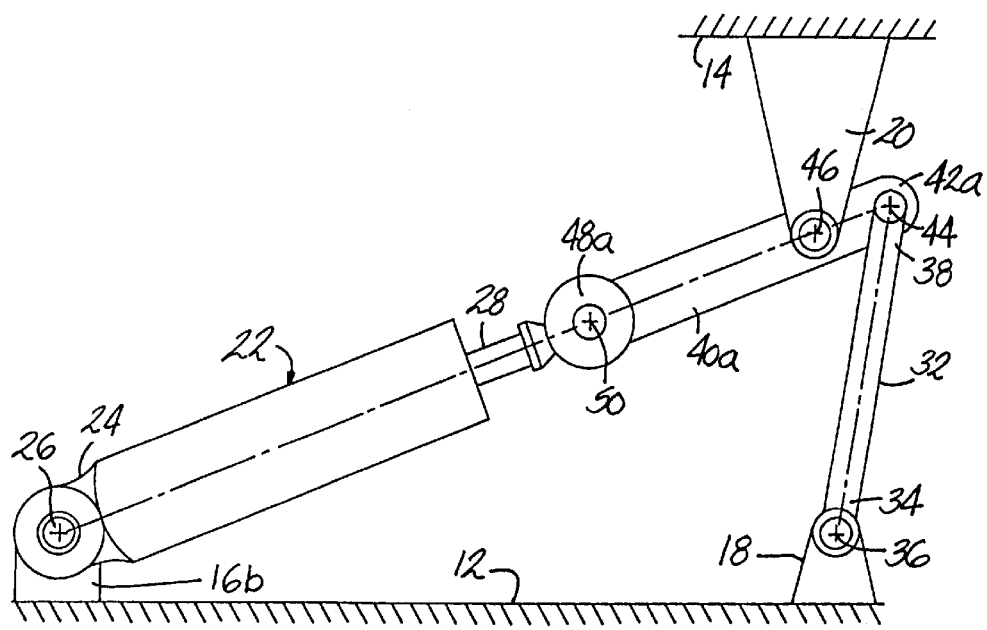
FIG. 3 shows a third embodiment of a vibration dampening assembly according to the invention.

Reference is now made to FIG. 3 for a description of a third embodiment of the invention in which like numerals have been used to designate like parts. The elements are shown in FIG. 3 at static condition or design height. In FIG. 3, a shorter pivot support 16b is mounted to the support plate 12 and the lever member 40a mounts the shock pivot pin 50, the main pivot pin 46 and the link pivot pin 44 in a common plane. In addition, the shorter pivot support 16b supports end 24 of the shock absorber 22 in a relatively lower position so that the rotational axis of pivot pin 26 lies in a common plane with the rotational axes of the shock pivot pin 50, the main pivot pin 46 and the link pivot pin 44 when the impact plate 14 and the support plate 12 are in a static condition or design height position. The operation of the dampening assembly illustrated in FIG. 3 is similar to that illustrated in FIG. 2.

Figure 4:
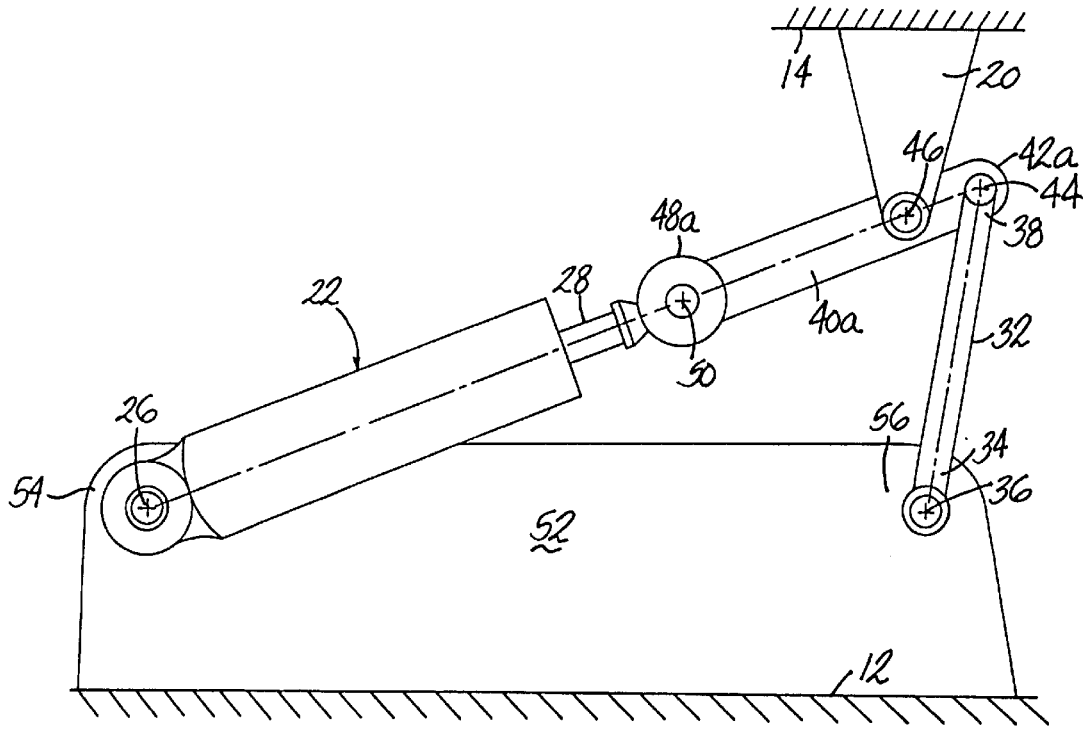
FIG. 4 shows a fourth embodiment of a vibration dampening assembly according to the invention.

Referring now to FIG. 4, there is shown a fourth embodiment of the invention wherein like numerals have been used to designate like parts. In FIG. 4, the elements of the assembly are shown in a static or design height condition. In FIG. 4, a cross member 52 extends from the support plate 12 and toward the impact plate 14. The cross member 52 further pivotably mounts the first end 34 of the link member 32 at an end 56 through pivot pin 36. In addition, the cross member 52 mounts the end 24 of the shock absorber 22 at an end 54 through the pivot pin 26. As in the previous embodiment, the axes of the pivot pins 26, the shock pivot pin 50, the main pivot pin 46 and the link pivot pin 44 lie in a common plane and intersect a common line perpendicular to the axes when the impact plate and the support plate are in a static or design height position.

The operation of the dampening device illustrated in FIG. 4 is similar to that of the dampening assemblies illustrated in FIGS. 2–3.

Figure 5:
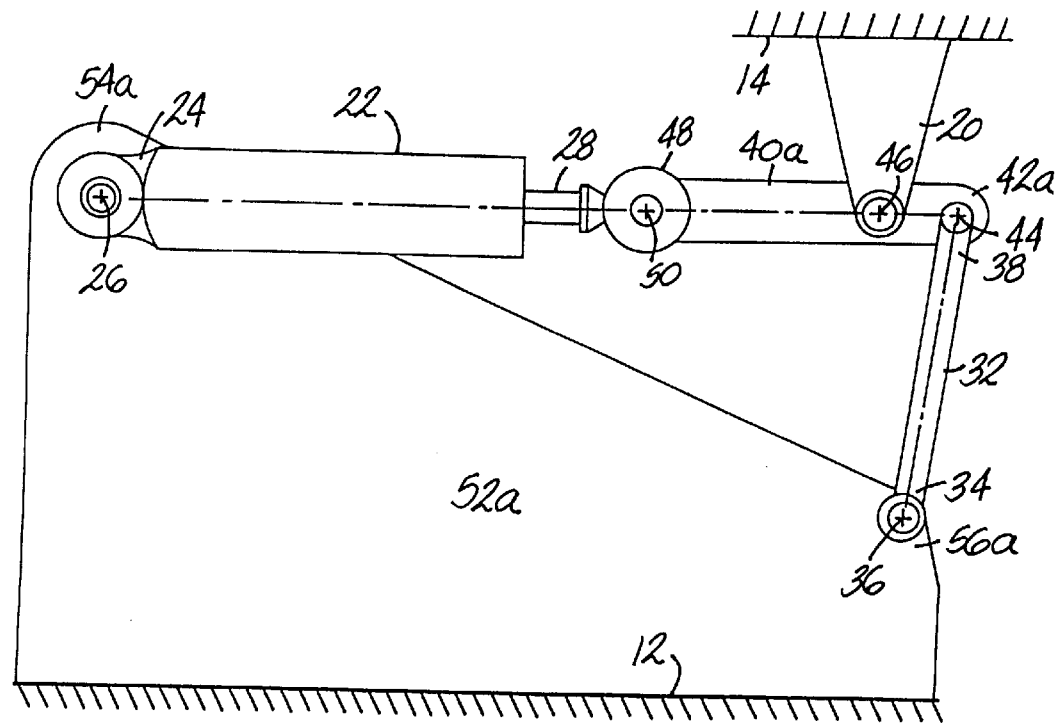
FIG. 5 shows a fifth embodiment of a vibration dampening assembly according to the invention.

Referring now to FIG. 5, there is shown a fifth embodiment of the invention wherein like numerals have been used to designate like parts. In FIG. 5, a cross member 52 a mounts at end 56 a the link member 32 through link pin 36. The end 24 of the shock absorber 22 is mounted to the cross member 52a at end 54a through pivot pin 26. As illustrated in FIG. 5, the axes of the pivot pin 26, the shock pivot pin 50, the main pivot pin 46 and the link pivot pin 44 lie in a common as, horizontal plane and intersect a common horizontal line perpendicular to the axes when the assembly is in a static condition at design height. The assembly of FIG. 5 is shown in a static or design height condition.

Figure 12:
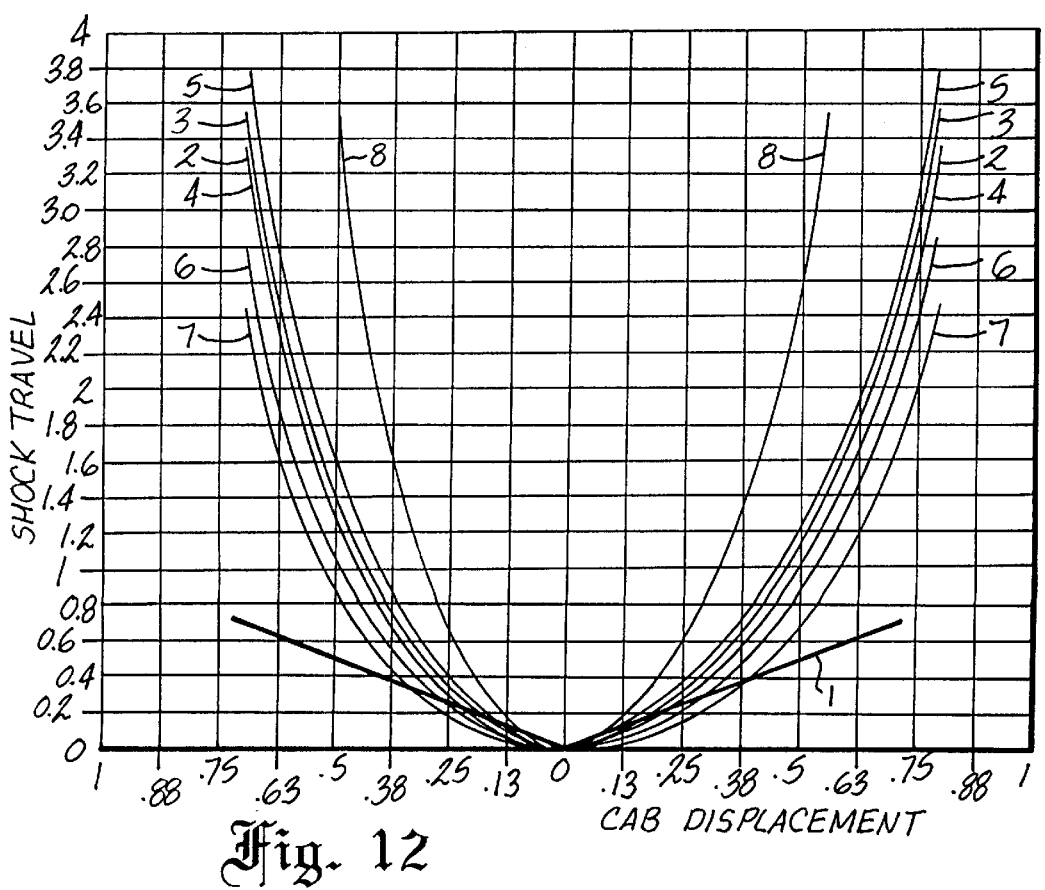
FIG. 12 shows a graph of dampening force versus displacement for several of the embodiments of the invention and also for a prior art dampening assembly.

The operation of the dampening assembly illustrated in FIG. 5 is similar to the operating characteristics of the dampening assembly illustrated in FIGS. 2–4. The shock travel versus cab displacement characteristics of the dampening assembly illustrated in FIG. 5 are shown on curve 2 in FIG. 12. A curve of a conventional vertically oriented shock absorber travel versus cab displacement is shown as curve 1 in FIG. 12 for comparison. The maximum degree of symmetry in jounce/rebound resistance profiles is obtained with this arrangement. The extension differential opposite configuration is shown in FIGS. 1–5, from the most general format in FIG. 1, to the most preferred arrangement in FIG. 5.

Figure 6:
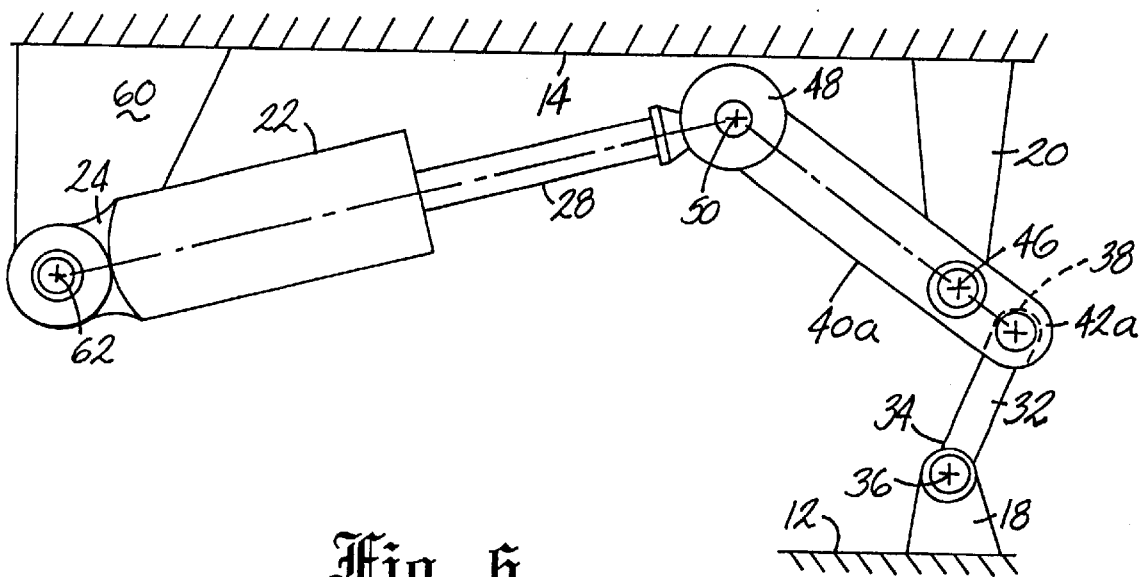
FIG. 6 shows a sixth embodiment of a vibration dampening assembly according to the invention.

Reference is now made to FIG. 6 which shows an extension opposite vibration dampening assembly according to the invention. Like numerals have been used to designate like parts. In the vibration dampening assembly illustrated in FIG. 6, end 24 of the shock absorber 22 is mounted to a pivot support 60 through pivot pin 62. Pivot support 60 is secured to the impact plate 14. The elements of the assembly are shown in FIG. 6 in a position displaced from the static, design height condition as a result of displacement of the impact plate toward the support plate. Ordinarily, the axes of the shock pivot, the main pivot, the link pivot 44 and the pivot pin 62 will lie in a common, essentially horizontal plane and intersect a common horizontal line perpendicular to the axes at static, design height condition.

The operation of the vibration dampening assembly illustrated in FIG. 6 is similar to the operation of the vibration dampening assemblies of FIGS. 1–5. The shock absorber travel versus cab displacement characteristics of the vibration dampening assembly of FIG. 6 are illustrated as curve 3 in FIG. 12.

Figure 7:
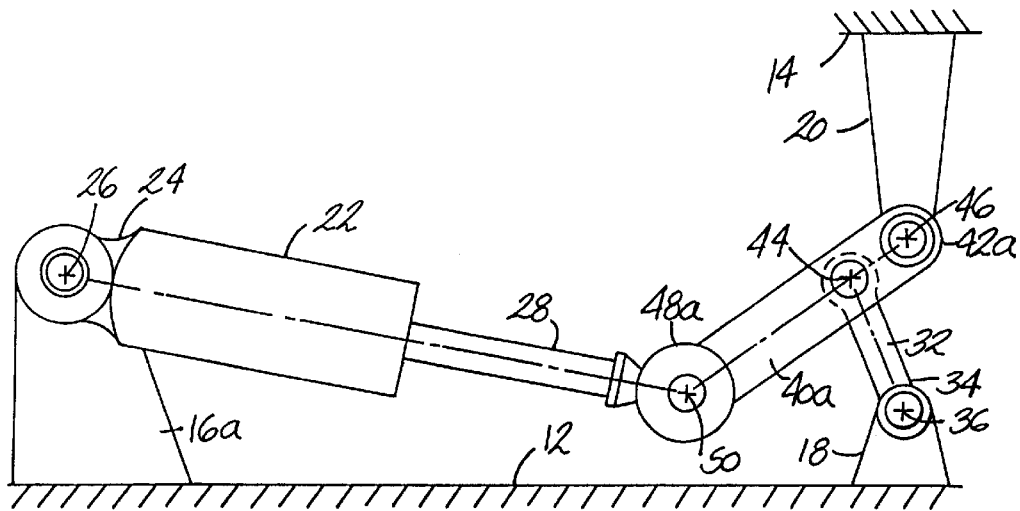
FIG. 7 shows a seventh embodiment of a vibration dampening assembly according to the invention.

Referring now to FIG. 7, there is shown an extension differential vibration dampening assembly wherein like numerals are used to designate like parts. In FIG. 7, the link member 32 is pivotably mounted to the lever member 40a through link pivot pin 44 at a point intermediate the ends 42a and 48a. The link 40a is further mounted to the impact plate 14 at the first end 42a through main pivot pin 46. Thus, the link 32 is pivotably mounted to the lever member 40a at a position intermediate the main pivot pin 46 and the shock pivot pin 50. The elements of the assembly of FIG. 7 are shown in a position displaced from a static, design height condition as a result of the displacement of the impact plate away from the support plate. Ordinarily, the axes of pivot pin 26, shock pivot pin 50, link pivot pin 44 and main pivot pin 46 lie in a common plane and intersect a common line perpendicular to the axes in the same static position.

The operation of the vibration dampening assembly illustrated in FIG. 7 is similar in some respects to the operation of the vibration dampening assemblies illustrated in FIGS. 1–6. However, the operating characteristics are substantially the same as the assembly of FIG. 5 as illustrated in curve 4 in FIG. 12.

Figure 8:
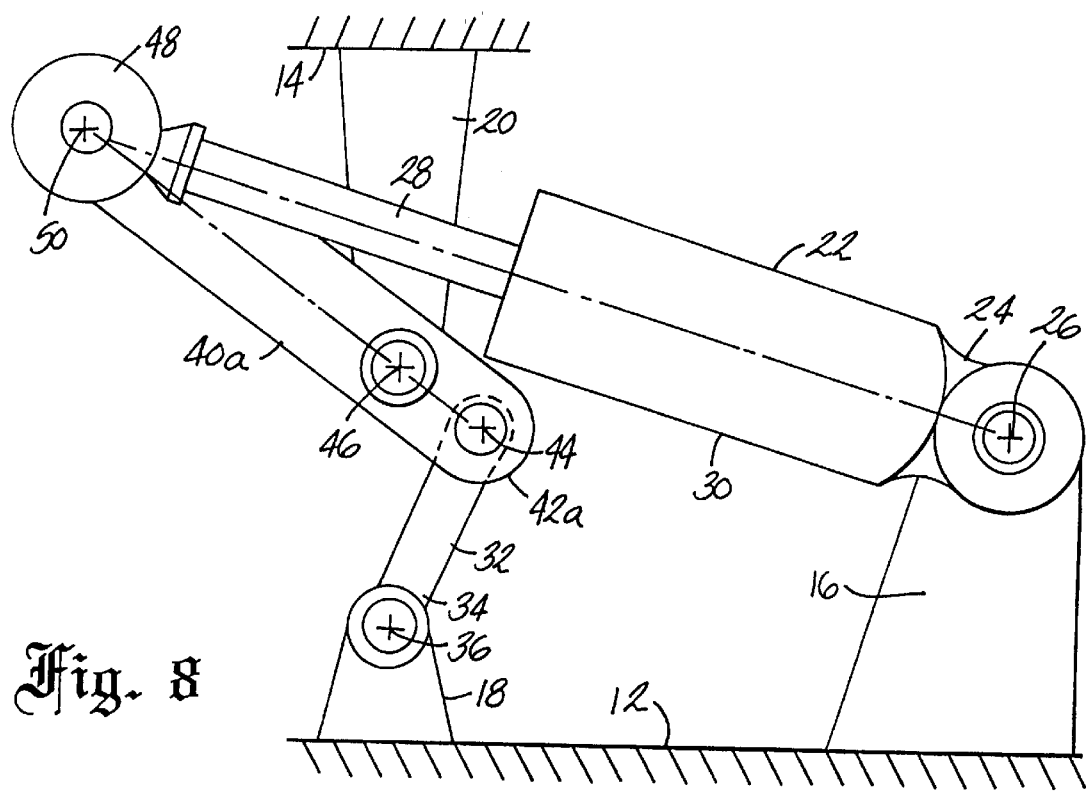
FIG. 8 shows an eighth embodiment of a vibration dampening assembly according to the invention.

Referring now to FIG. 8, there is shown a compression differential opposite vibration dampening assembly according to the invention wherein like numerals are used to designate like parts. In this embodiment, the shock absorber 22 works in compression as the impact plate 14 moves vertically with respect to the support plate 12. In FIG. 8, there is a geometric elevational overlap between the lever 40a and the shock absorber 22 so that as the lever 40a and the shock absorber 22 rotate from a neutral position, the resistance rod 28 will be forced into the cylindrical housing 30 of the shock absorber 22. The relationship of the components of the vibration dampening assembly illustrated in FIG. 8 are shown in a position in which the impact plate is displaced upwardly from the support plate from a design height position. Normally, in a static or design height position, the axes of the pivot pin 26, the shock pivot pin 50, the link pivot pin 44 and the shock pin 50 would essentially lie in a substantially horizontal common plane and intersect a common substantially horizontal line.

The operation of the vibration dampening assembly illustrated in FIG. 8 is similar to the operation of the vibration dampening assemblies illustrated in FIGS. 1–7. The shock absorber versus cab displacement curve, however, is somewhat different and is shown as curve 5 in FIG. 12.

Figure 9:
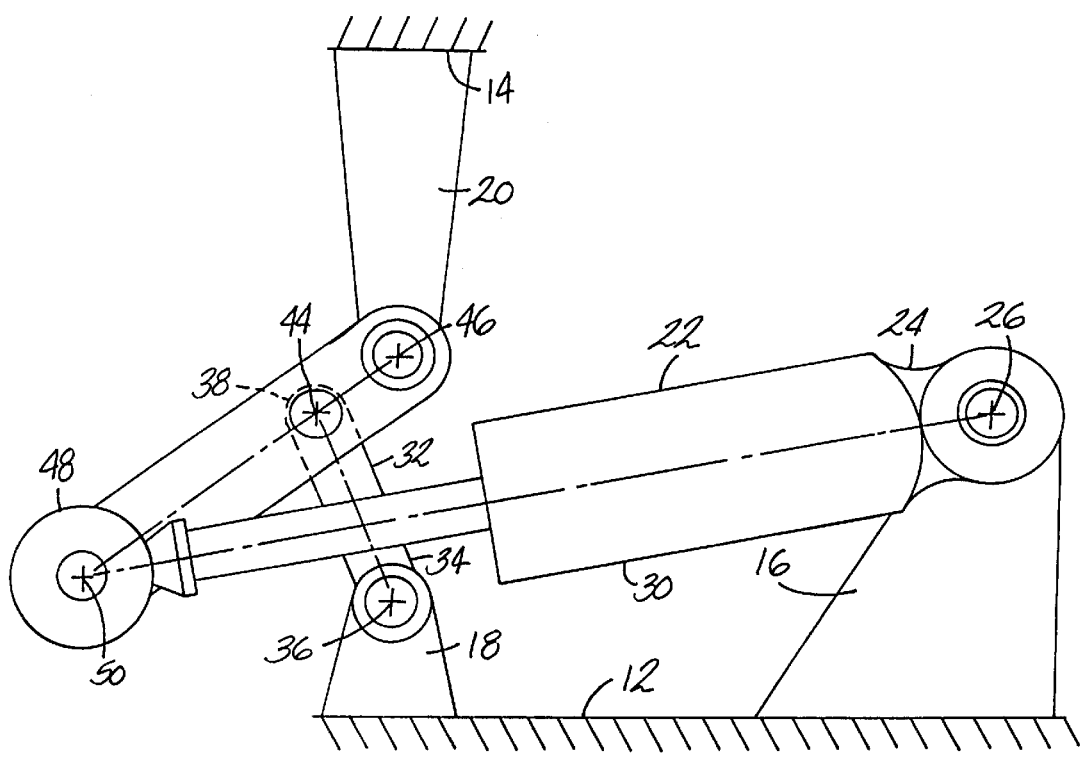
FIG. 9 shows a ninth embodiment of a vibration dampening assembly according to the invention.

Referring now to FIG. 9, there is shown a compression differential vibration dampening assembly wherein like numerals have been used to designate like parts. This embodiment is similar to the embodiment illustrated in FIG. 8 except that the link member 32 is attached to lever 40a intermediate the lever first and second ends. In FIG. 9, the impact plate is shown displaced downwardly with respect to the support plate from a normal static or design height position. Ordinarily, the axes of the shock pivot pin 50, the pivot pin 26, the lever pivot pin 44 and the main pivot pin lie essentially in a common horizontal plane and intersect a common substantially horizontal line perpendicular to the axes when the assembly is in a static or design height position.

The vibration dampening assembly illustrated in FIG. 9 operates in a manner similar to the vibration dampening assemblies of FIGS. 1–8. However, the operating characteristics, i.e., shock absorber travel versus cab displacement, are somewhat different from the embodiments of FIGS. 1–8 and the operating characteristics are illustrated in curve 6 on FIG. 12.

Figure 10:
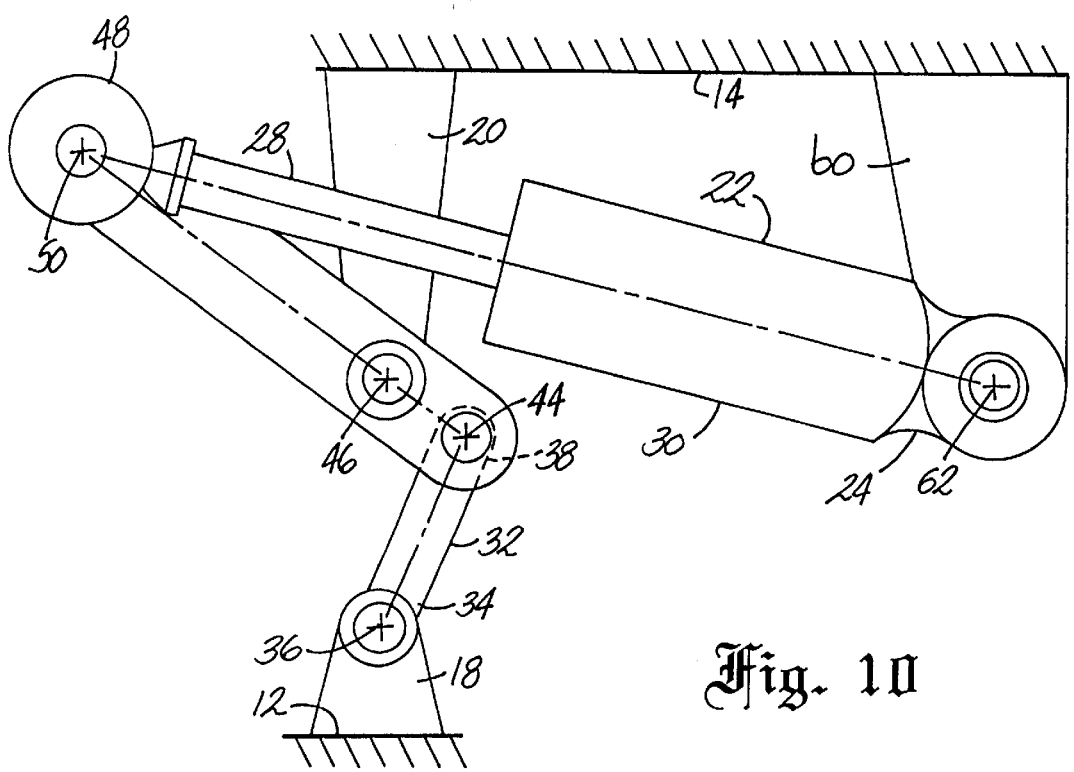
FIG. 10 shows a tenth embodiment of a vibration dampening assembly according to the invention.

Referring now to FIG. 10, there is shown a compression opposite vibration dampening assembly according to the invention wherein like numerals have been used to designate like parts. This embodiment is similar to the embodiment of FIG. 8 except that the shock absorber 22 is anchored to the impact plate 14 instead of the support plate 12. The dampening device of FIG. 10 works similar to the dampening device of FIG. 8 and has operating characteristics similar to those of FIG. 8 as illustrated by curve 7 in FIG. 12. In FIG. 10, the impact plate is shown displaced upwardly from a normal design height condition in which the axes of the shock pivot pin 50, the main pivot pin 46, the link pivot pin 44 and the pivot pin 62 essentially lie in a substantially horizontal plane and intersect a substantially horizontal line perpendicular to the axes.

Figure 11:
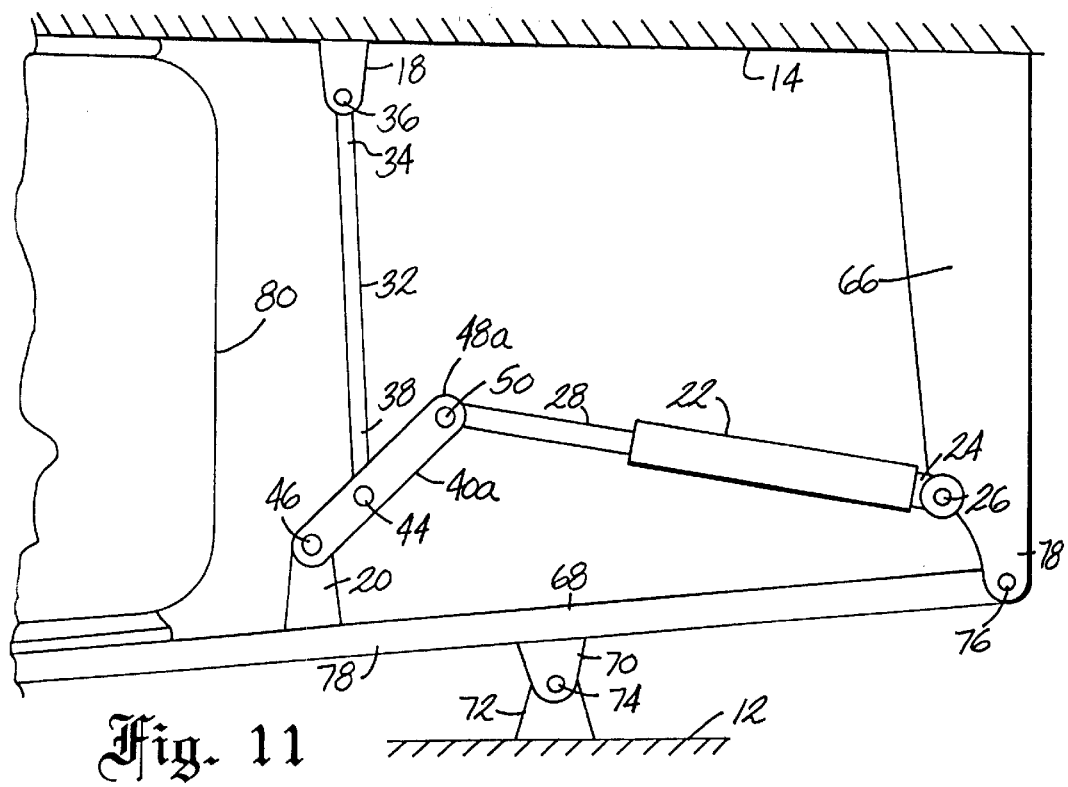
FIG. 11 shows an eleventh embodiment of a vibration dampening assembly according to the invention.

Referring now to FIG. 11, there is shown an eleventh embodiment of the invention where like numerals have been used to designate like parts. In FIG. 11, the impact plate 14 has a pivot support 18 mounted thereon and further has a lever support 66 mounted thereon and depending therefrom. The pivot support 18 pivotably mounts a first end 34 of link member 32 through pivot pin 36. A lever member 40a pivotably mounts a second end 38 of link 32 through link pivot pin 44. The lever member 40a is pivotably mounted to a secondary lever member 68 through a pivot support 20 and a pivot pin 46. A shock absorber 22 is pivotably mounted at one end to the lever support 66 through pivot pin 26 and is mounted at the free end of resistance rod 28 to end 48a of lever member 40a through shock pivot pin 50. The secondary lever member 68 is pivotably mounted to the support plate 12 through a depending pivot support 70, an upstanding pivot support 72 and a secondary lever pivot pin 74. The secondary lever member 68 is pivotably mounted to a lower end 78 of the lever support 66 through a pivot pin 76. An air spring 80 is mounted between a distal end 78 of secondary lever member 68 and the impact plate 14 to cushion the displacement of the impact plate 14 toward the support plate 12 and to further support the impact plate 14 at design height. The vibration dampening mechanism illustrated in FIG. 11 can be used with or without the air spring 80 or with another type of spring between the impact plate 14 and the secondary lever member 68.

The elements of the assembly of FIG. 11 are shown in a position in which the impact plate is displaced upwardly with respect to the support plate compared to a static or design height condition. Ordinarily, the axes of the main pivot pin 46, the shock pivot pin 50, the link pivot pin 44 and the pivot pin 26 essentially lie in a substantially horizontal common plane and intersect a common substantially horizontal line perpendicular to the axes when the assembly of FIG. 11 is in a static condition or at design height.

The operation of the vibration dampening assembly of FIG. 11 is similar to the operation of the vibration dampening assemblies illustrated in FIGS. 1–10 with the exception that the secondary lever member will pivot about the pivot pin 74 during relative movement between the impact plate and the support plate. This difference results in somewhat different operating characteristics. In particular, the mechanical dampening force exerted by the shock absorber 22 is magnified by the secondary lever member 68. The degree of magnification depends on the lever distance between the main pivot 46 and the secondary lever pivot pin 74.

Figure 13:
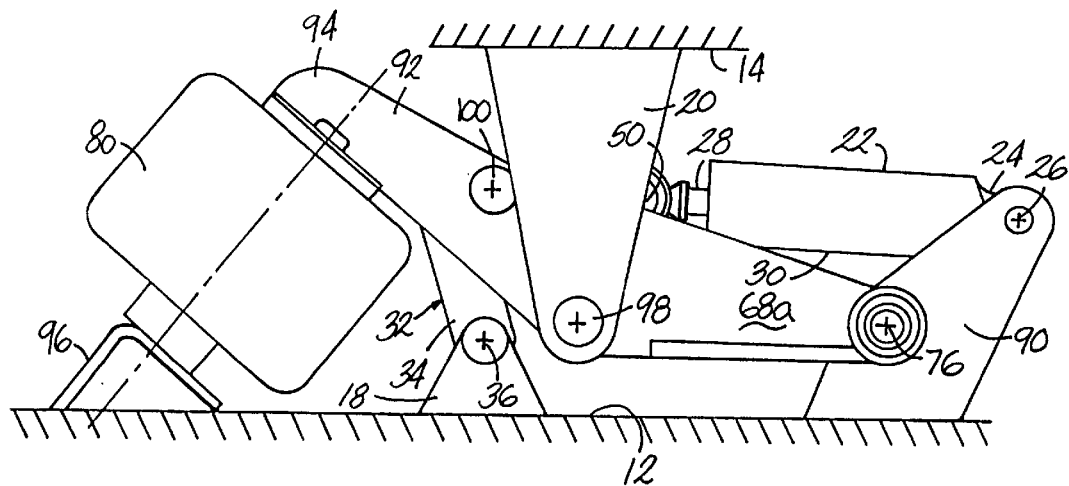
FIG. 13 is a schematic elevational view of a twelfth embodiment of a vibration dampening assembly according to the invention.
Figure 14:
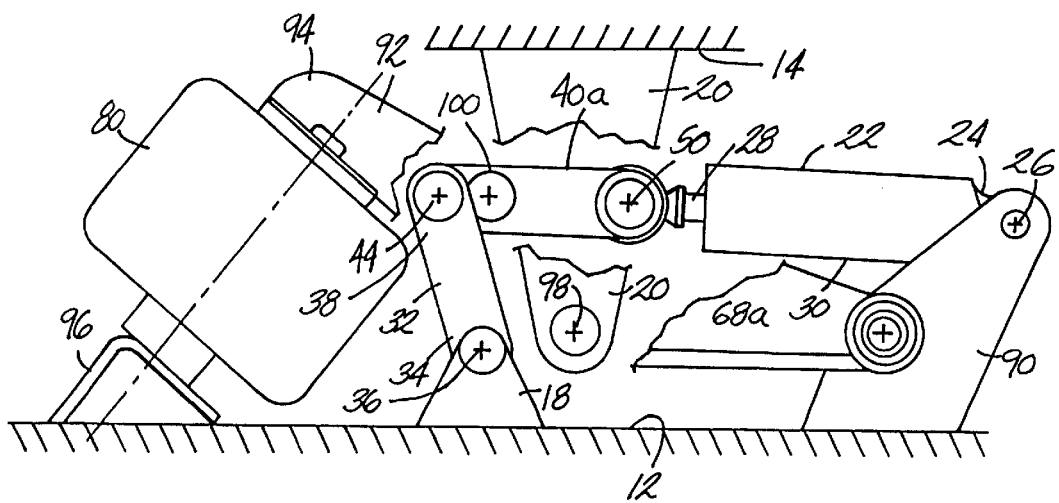
FIG. 14 is a similar view of the vibration dampening assembly illustrated in FIG. 13 with portions of the assembly broken away.

Referring now to FIGS. 13 and 14, there is shown a twelfth embodiment of the invention where like numerals have been used to designate like parts. The embodiment shown in FIGS. 13 and 14 is similar to the embodiment shown in FIG. 11 in that a vibration dampening assembly is mounted between a support plate or impact plate and a secondary lever, and an air spring 80 is mounted between the secondary lever and the other of the impact plate and the support plate. The support plate 12 mounts the first end 34 of a link member 32 through a pivot pin 36 and pivot support 18. The second end 38 of the link member 32 is pivotably mounted to lever member 40a through link pivot pin 44. A second end 48a of the lever member 40a is pivotably mounted to an end of shock absorber 22 through shock pivot pin 50. The shock absorber 22 has a resistance rod 28 which telescopes with a cylindrical housing 30. The movement of the resistance rod 28 into and out of the cylindrical housing 30 produces a resistance in the cylinder proportional to the rate of movement of the rod 28. The shock absorber 22 is pivotably mounted at one end 24 to an upstanding pivot support 90 through pivot pin 26. The upstanding pivot support 90 is mounted to the support plate 12. A secondary lever member 68a is pivotably mounted at one end to the upstanding pivot support 90 through pivot pin 76 at a location below pivot pin 26. The secondary lever member 68a is triangular in shape and is pivotably mounted at a central portion to a pivot support 20 through pivot pin 98. The pivot support 20 is mounted to the impact plate 14. The lever member 40a is pivotably mounted to the secondary lever member 68a through main pivot pin 100. A second end 92 of the lever member 68a is mounted to an air spring 80 through an upper support plate 94. The air spring 80 is mounted at a lower end to the support plate 12 through a lower support plate 96. As illustrated in FIGS. 13 and 14, the axis of the air spring 80 is at an acute angle to the vertical, preferably at about 45° to the vertical. The vibration dampening mechanism illustrated in FIGS. 13 and 14 can be used with or without the air spring 80 or with a different type of spring between the secondary lever member 68a and the support plate 12.

The suspension system illustrated in FIGS. 13 and 14 is shown in a static or design height condition. As illustrated, the axes of the link pivot pin 44, the main pivot pin 100, the shock pivot pin 50 and the pivot pin 26 all lie in a common plane and intersect a common horizontal line perpendicular to the axes. As illustrated in FIGS. 13 and 14, the axis of the shock absorber 22 also lies in the common plane.

In operation, as the impact plate moves toward the support plate, the pivot support 20, including the pivot pin 98, will move downwardly with respect to the support plate 12. This movement will rotate the secondary lever arm 68a about the pivot pin 76, thereby compressing the air spring 80. At the same time, the link 32 will rotate in a counterclockwise direction as viewed in FIGS. 13 and 14, thereby extending the resistance rod 28 out of the cylindrical housing 30. For small displacements of the impact plate with respect to the support plate, the shock absorber 22 will tend to rotate about pivot pin 26 with little change in the extension of the resistance rod 28. However, as the displacement between the impact plate and the support plate becomes greater, the extension of the resistance rod 28 from the cylindrical housing 30 will become greater. The distance moved by the resistance rod 28 will be amplified by the secondary lever member 68a as it rotates about pivot pin 76.

It will be observed from FIGS. 13 and 14 that the secondary lever member 68a provides a pivotable linkage connection between the support plate and the impact plate. Thus, that portion of the secondary lever member 68a between the pivot pins 76 and 98 functions as a track bar to laterally stabilize the impact plate 14 with respect to the support plate 12. Further, it will be observed that the suspension system illustrated in FIGS. 13–16 has a single air spring. In prior suspension systems using a variable dampening assembly, two air springs have been required. The lever arm provides the stability for a single air spring.

The operating characteristics of the vibration dampening assembly illustrated in FIGS. 13 and 14 are similar to those of the vibration dampening assembly illustrated in FIG. 11.

Figure 15:
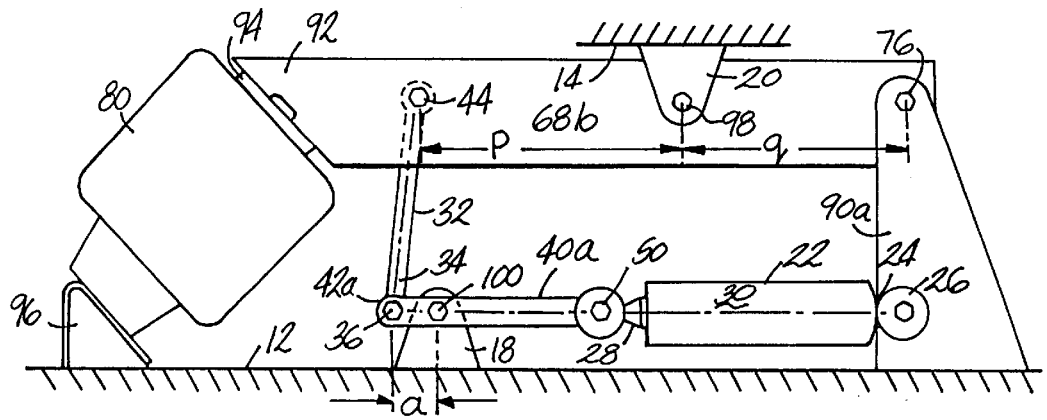
FIG. 15 is a schematic elevational view of a thirteenth embodiment of a vibration dampening assembly according to the invention.

Reference is now made to FIG. 15 which shows a thirteenth embodiment of the invention where like numerals are used to designate like parts. The embodiment shown in FIG. 15 is similar to the embodiments shown in FIGS. 11, 13 and 14 in that a vibration dampening assembly is mounted between a support plate 12 or impact plate 14 and a secondary lever 68b, and an air spring is mounted between the secondary lever 68b and the other of the impact plate and the support plate. The support plate 12 mounts a first end of the lever 68b through a pivot pin 76 and an upstanding pivot support 90a. The lever 68b is also pivotably mounted to the impact plate 14 but at a central location through pivot pin 98 and pivot support 20. The second end 92 of the secondary lever 68b is mounted to an upper mounting plate 94 of an air spring 80 which in turn is mounted to the support plate 12 at a lower end through lower mounting plate 96. A shock absorber 22 is mounted at one end 24 to the upstanding pivot support 90a through pivot pin 26 and is pivotably mounted through resistance rod 28a to a second end 48a of a lever member 40a through a shock pivot pin 50. The lever 40a is pivotably mounted to the support plate 12 through main pivot pin 100 and a pivot support 18. A first end 42a of the lever member 40a is pivotably mounted to a link member 32 through a pivot pin 36. The other end of the link member 32 is pivotably connected at a second end 92 of the lever member 68b through link pivot pin 44.

In operation, as the impact plate 14 moves with respect to the support plate 12, the second lever 68b will rotate about pivot pin 76, with the downward rotation (counterclockwise as viewed in FIG. 15) being cushioned by the air spring 80. At the same time, the lever member 40a will rotate about the main pivot pin 100, being forced downwardly or upwardly by the link 32 as the secondary lever 68b rotates upwardly or downwardly, respectively. As the lever member 40a rotates about the main pivot 100, the shock absorber 22 will rotate about the pivot pin 26. For small oscillations about pivot pin 26, the resistance rod 28 will move relatively little with respect to the cylindrical housing 30. However, as the oscillations increase in amplitude, the resistance rod will begin to extend out of the cylindrical housing 30, thereby dampening the rotational movement of the lever member 40a and thereby dampening the rotational movement of the secondary lever 68b about the pivot pin 98. The operating characteristics of the vibration dampening assembly illustrated in FIG. 15 are believed to be similar to those of the vibration dampening assemblies illustrated in FIGS. 11, 13 and 14 and are illustrated as curve 8 on FIG. 12.

Figure 16:
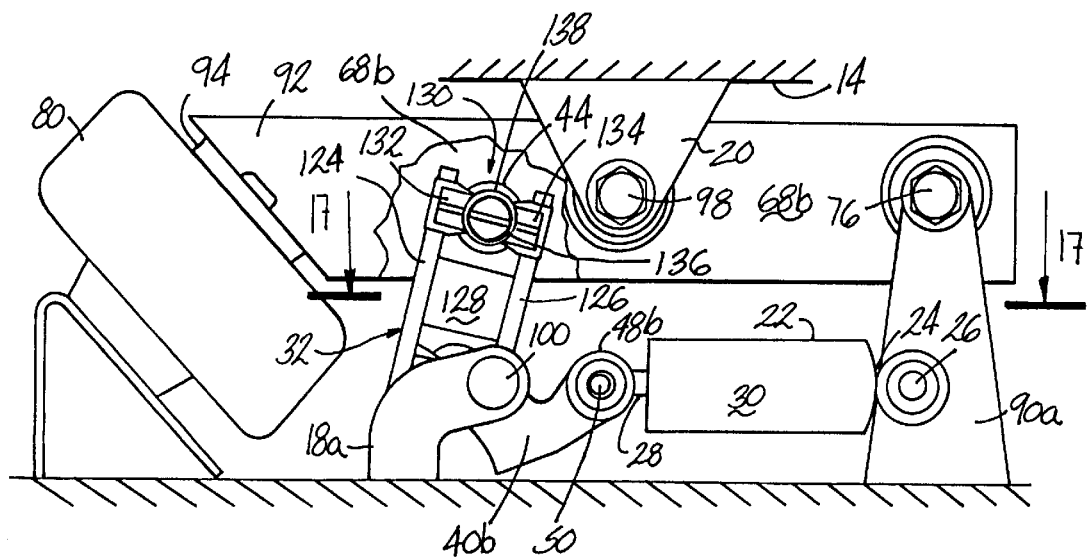
FIG. 16 is a more detailed elevational view of the thirteenth embodiment of a vibration dampening assembly according to the invention.
Figure 17:
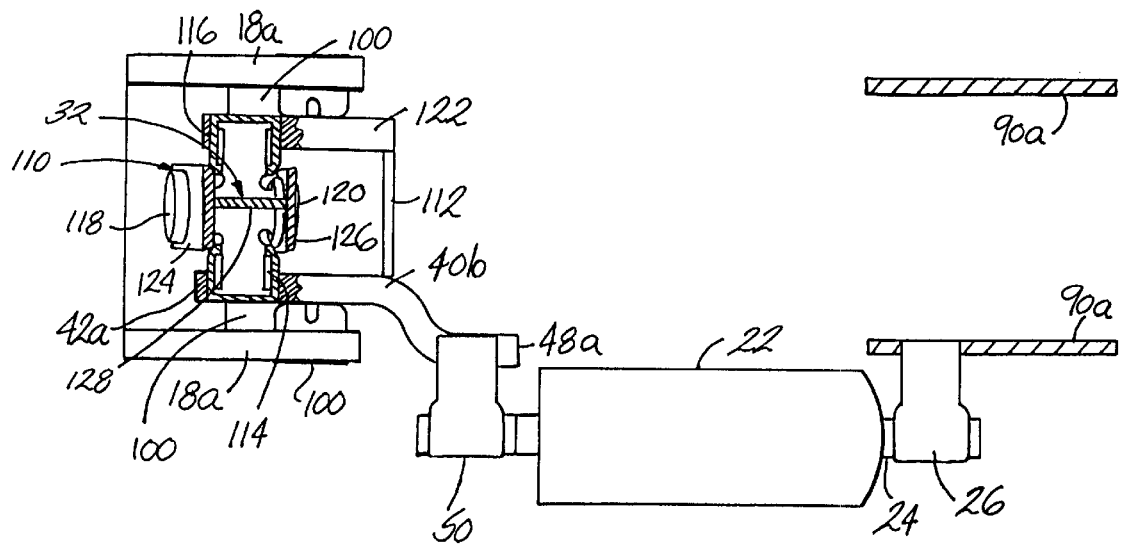
FIG. 17 is a plan view taken along lines 17—17 of FIG. 16.

Reference is now made to FIGS. 16 and 17 which show more detailed versions of the thirteenth embodiment of the invention shown in FIG. 15. Like numerals have been used to designate like parts.

In particular, the lever member 40 b, the link member 32, the pivotable connection between the lever member 40b and the link member 32 and the pivotable connection between the secondary lever 68b and the link member 32 are shown in greater detail. The lever member 40b has a first end 42a pivotably connected to the link member 32 through a pivot assembly 110. The pivot assembly 110 is a conventional universal joint assembly (serves as antifriction pivot bearing connections) and comprises a cross-shaped body 112 with bearings 114, 116, 118 and 120 at its four ends. The first end 42a of the lever member 40b is pivotably mounted to the cross-shaped body 112 through bearings 114. An arm 122 is pivotably mounted to one of the pivot supports 18a through bearing 116 and pivot pin 100 along the same axis as the first end 42a of the lever member 40a is mounted to the other of the pivot supports 18a. The arm 122 is also pivotably mounted to the cross-shaped body 112 of the pivot assembly 110 through bearing 116. Thus, the pivot assembly 110 is mounted at one end on the arm 122 and at an opposite end to the lever member 40a. The first end 42a of the lever member 40b is offset laterally from the second end 48a thereof as illustrated in FIG. 17.

The link member 32 comprises a pair of legs 124 and 126 which are joined at a central portion through a connector 128 which forms a double-ended yoke assembly. The lower ends of the legs 124 and 126 are pivotably mounted to the cross-shaped body 112 of the pivot assembly 110 through bearings 118 and 120, respectively.

A pivot assembly 130 is substantially identical with the pivot assembly 110 and is mounted between the upper ends of the legs 124 and 126 and the secondary lever 68b. As shown in FIG. 16, the upper ends of the legs 124 and 126 are pivotably mounted to a cross-shaped body 138 through bearings 132 and 134, respectively. Bearings 136, only one of which is shown is FIG. 16, pivotably mount the cross-shaped body 138 to the secondary lever 68b. In practice, there are two identical spaced apart sides to secondary lever 68b which are parallel to one another and which mount the pivot assembly 130 between them through the link pivot pins 44.

Figure 18:
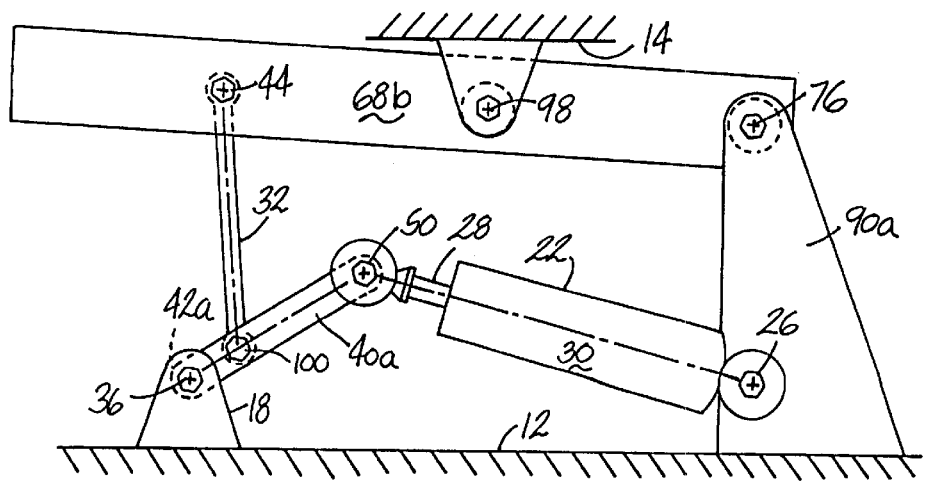
FIG. 18 is a schematic elevational view of a fourteenth embodiment of a vibration dampening assembly according to the invention.

Reference is now made to FIG. 18 which shows a fourteenth embodiment of the invention where like numerals have been used to designate like parts. The embodiment illustrated in FIG. 18 is similar to the embodiment illustrated in FIGS. 15–17 except that the relative positions of the pivotable mounting of the link 32 and the pivot support 18 to the lever member 40a have been reversed. Thus, the link 32 is pivotably mounted at an intermediate portion of the lever member 40a through the main pivot pin 100 and the pivot support 18 is mounted to the first end 42a of the lever member 40a through the pivot pin 36. Otherwise, the vibration dampening assembly is the same and works in a similar manner. The vibration dampening assembly illustrated in FIG. 18 is shown in a position wherein the longitudinal axis of the lever 40a intersects the longitudinal axis of the shock absorber 22. This figure shows the system displaced from the equilibrium or rest position and illustrates a movement of the impact plate 14 with respect to the support plate 12 upwardly from a rest position. Preferably, the rest position is defined wherein the longitudinal axis of the lever member 40a is parallel to the longitudinal axis of the shock absorber 22. In this condition, the force versus displacement characteristics of the dampening assembly will be isotropic about the rest position.

A modification of FIG. 18 is to pivotably mount the link 32 to the pivot support 18 and to pivotably mount the lever member 40a to the secondary lever 68b. In other words, pivot pin 44 would be mounted to pivot support 18 and pivot pin 36 would be mounted to secondary lever 68b. Thus, lever pivot 36 would travel with track bar 68b.

Figure 19:
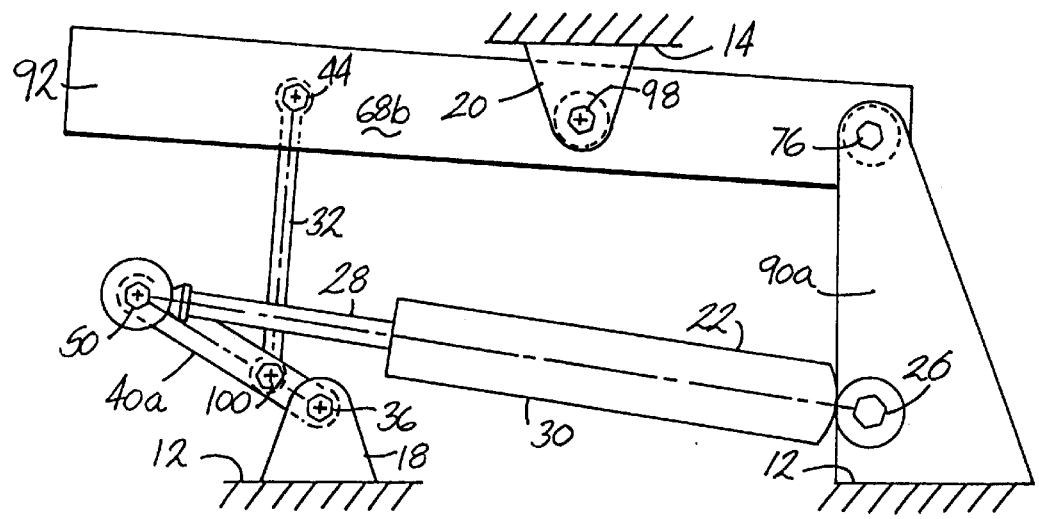
FIG. 19 is a schematic elevational view of a fifteenth embodiment of a vibration dampening assembly according to the invention.

FIG. 19 shows a fifteenth embodiment of the invention and is similar to the embodiment shown in FIGS. 15–18 with the exception that the shock absorber 22 works in compression rather than extension. In the embodiment of FIG. 19, the position of the lever 40a is rotated approximately 180° from the position of the lever 40a in FIG. 18. The dampening assembly of FIG. 19 is illustrated in a position wherein the impact plate 14 is displaced from the support plate 12. As the impact plate 14 moves downwardly or upwardly from the static position, the resistance rod 28 will tend to move into the cylindrical housing 30 of the shock absorber 22, assuming that the longitudinal axis of the lever member 40a is parallel to the longitudinal axis of the shock absorber 22 when the impact plate 14 is at an at rest position with respect to the support plate 12. The operating characteristics of the dampening assembly illustrated in FIG. 19 are believed to be similar to those of the dampening assembly illustrated in FIG. 18. Although not shown in FIG. 19, a single air spring, as illustrated, for example, in FIG. 15, can be deployed between the support plate 12 and the second end 92 of the secondary lever 68b. The system then becomes an integrated suspension damping configuration where the unit in FIG. 19 is strictly a levered variable geometry damper. As in FIG. 18, the pivot mounting 44 of the link 32 to the secondary lever 68b can be interchanged with the pivot mounting 36 of the lever member 40a to the pivot support 18.

Figure 20:
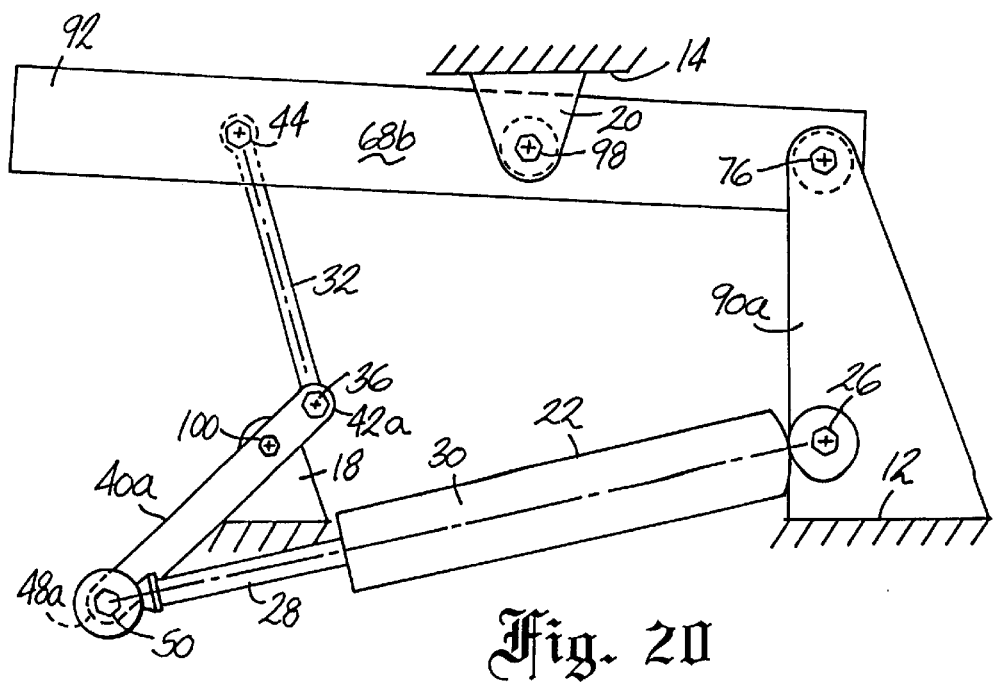
FIG. 20 is a schematic elevational view of a sixteenth embodiment of a vibration dampening assembly according to the invention.

Reference is now made to FIG. 20 which illustrates a sixteenth embodiment of the invention where like numerals have been used to designate like parts. The vibration dampening assembly illustrated in FIG. 20 is similar to the vibration dampening assembly illustrated in FIGS. 15–17 except that the resistance provided by the shock absorber 22 results from compression of the resistance rod 28 rather than extension of the resistance rod 28 with respect to the cylindrical housing 30. Thus, the first end 42a and the second end 48a of the lever member 40a are rotated approximately 180° from the position illustrated in FIG. 15. The vibration dampening assembly illustrated in FIG. 20 is shown in a position displaced from a preferential equilibrium position wherein the longitudinal axis of the lever member 40a is parallel to the longitudinal axis of the shock absorber 22. In contrast, the longitudinal axis of the lever member 40a is angularly displaced with respect to the longitudinal axis of the shock absorber 22 in the position shown in FIG. 15. Although not shown in FIG. 20, an air spring could be provided between the second end 92 of the secondary lever 68b and the support plate 12, as illustrated, for example, in FIG. 15.

The operating characteristics of the vibration dampening assembly illustrated in FIG. 20 are believed to be substantially identical with the operating characteristics of the suspension dampening assembly illustrated in FIGS. 15–17.

Figure 21:
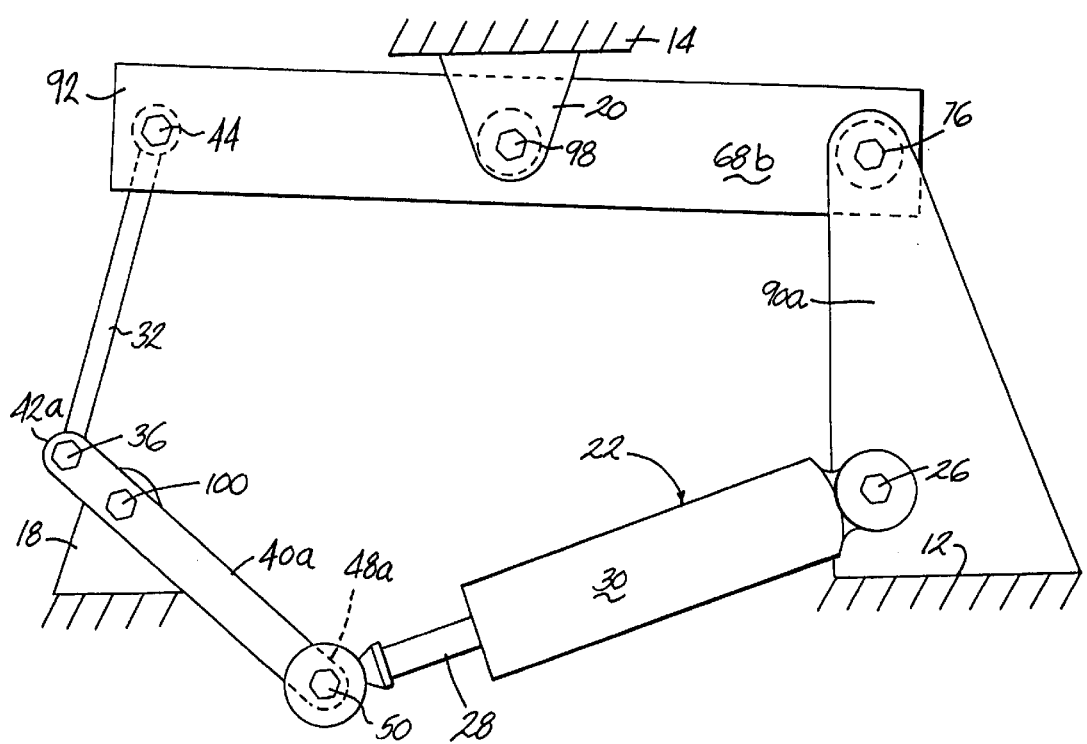
FIG. 21 is a schematic elevational view of a seventeenth embodiment of a vibration dampening assembly according to the invention.

Referring now to FIG. 21 there is shown a seventeenth embodiment of the invention where like numerals have been used to designate like parts. The vibration dampening assembly illustrated in FIG. 21 is similar to the vibration dampening assembly illustrated in FIG. 20 except that the resistance provided by the shock absorber 22 results from extension of the resistance rod 28 rather than compression of the resistance rod 28 with respect to the cylindrical housing 30. Thus, the first end 42a and second end 48a of the lever member 40a are located approximately 180° from the position shown in FIG. 20 when the vibration dampening assembly is in an equilibrium position. Preferably, the vibration dampening assembly illustrated in FIG. 21 is in an equilibrium position when the longitudinal axis of the lever member 40a is aligned with the longitudinal axis of the shock absorber 22. As in FIG. 20, an air spring can be provided between the second end 92 of the secondary lever 68b and the support plate 12, as illustrated, for example, in FIG. 15.

The operating characteristics of the vibration dampening assembly illustrated in FIG. 21 are believed to be substantially identical with the operating characteristics of the suspension dampening assembly illustrated in FIG. 20.

Figure 22:
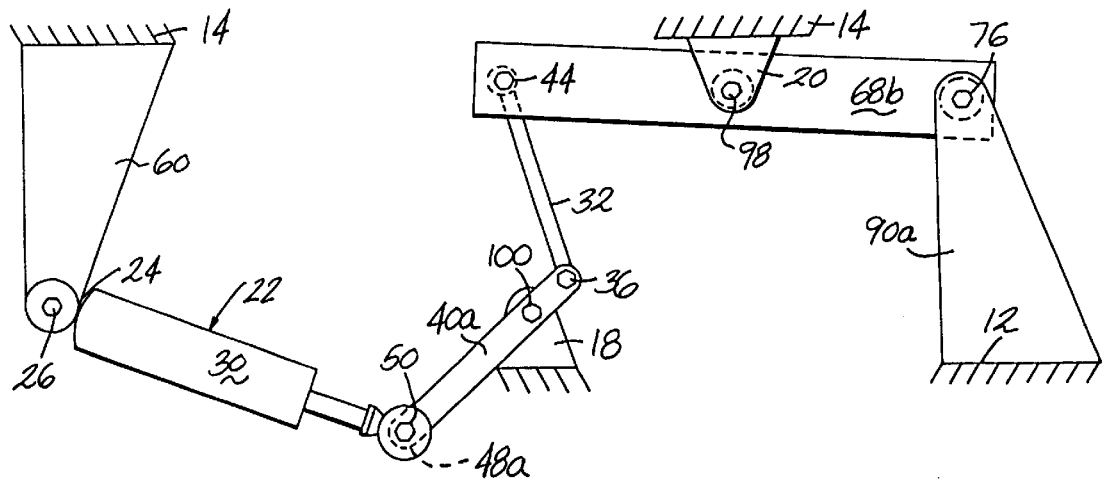
FIG. 22 is a schematic elevational view of an eighteenth embodiment of a vibration dampening assembly according to the invention.

Referring now to FIG. 22, which illustrated an eighteenth embodiment of the invention where like numerals are used to designate like parts, the vibration dampening assembly is similar to the vibration dampening assembly illustrated in FIG. 21 except that the one end 24 of the shock absorber 22 is pivotably mounted to the impact plate 14 through pivot pin 26 and pivot support 60. The suspension illustrated in FIG. 22 is shown with the impact plate 14 displaced away from the support plate 12 from the equilibrium position. The operating characteristics of the suspension illustrated in FIG. 22 are believed to be similar to the operating characteristics of the suspension illustrated in FIG. 21. The equilibrium position of the suspension illustrated in FIG. 22 is a position in which the longitudinal axis of the shock absorber 22 and the longitudinal axis of the lever member 40a are in alignment.

Figure 23:
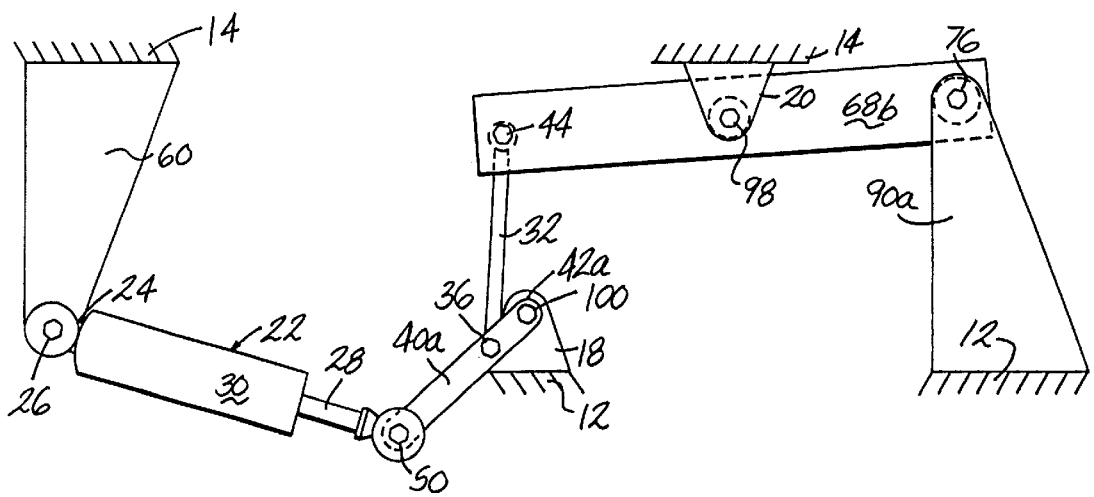
FIG. 23 is a schematic elevational view of a nineteenth embodiment of a vibration dampening assembly according to the invention.

Reference is now made to FIG. 23 which shows a nineteenth embodiment of the invention where like numerals have been used to designate like parts. The vibration dampening assembly illustrated in FIG. 23 is similar to the vibration dampening assembly illustrated in FIG. 22 except that the link member 32 is pivotably mounted to the lever member 40a at a pivot pin 36 intermediate the ends of the lever member 40a. Further, the lever member 40a is pivotably mounted at a first end 42a to the support plate 12 through the pivot support 18 and the main pivot pin 100. The vibration dampening assembly illustrated in FIG. 23 is shown displaced from a preferable equilibrium position in which the longitudinal axis of the shock absorber 22 is aligned with the longitudinal axis of the lever member 40a. The operating characteristics of the vibration dampening assembly illustrated in FIG. 23 are believed to be similar to those of the vibration dampening assembly illustrated in FIG. 22.

Figure 24:
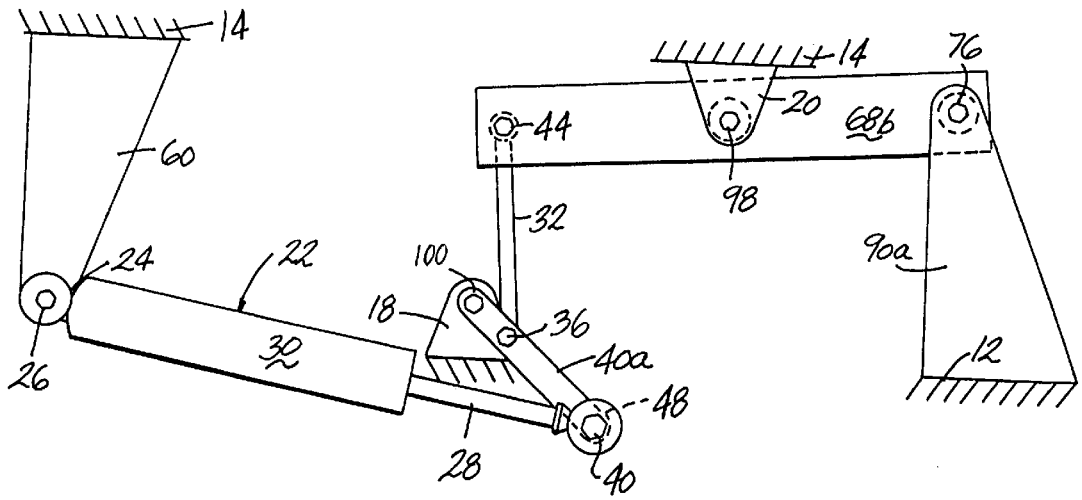
FIG. 24 is a schematic elevational view of a twentieth embodiment of a vibration dampening assembly according to the invention.

Reference is now made to FIG. 24 which illustrates a twentieth embodiment of a vibration dampening assembly according to the invention where like numerals have been used to designate like parts. The vibration dampening assembly illustrated in FIG. 24 is substantially identical with the vibration dampening assembly illustrated in FIG. 23 with the exception that the lever member 40a is rotated approximately 180° with respect to each other and the shock absorber acts in compression to resist deflection rather than extension as in the embodiment of FIG. 23. The vibration dampening assembly illustrated in FIG. 24 shown in a displaced position from a preferred equilibrium position in which the longitudinal axis of the shock absorber 22 is parallel to the longitudinal axis of the lever member 40a. The operating characteristics of the vibration dampening assembly illustrated in FIG. 24 are believed to be substantially identical with the operating characteristics of the vibration dampening assembly illustrated in FIG. 22.

Figure 25:
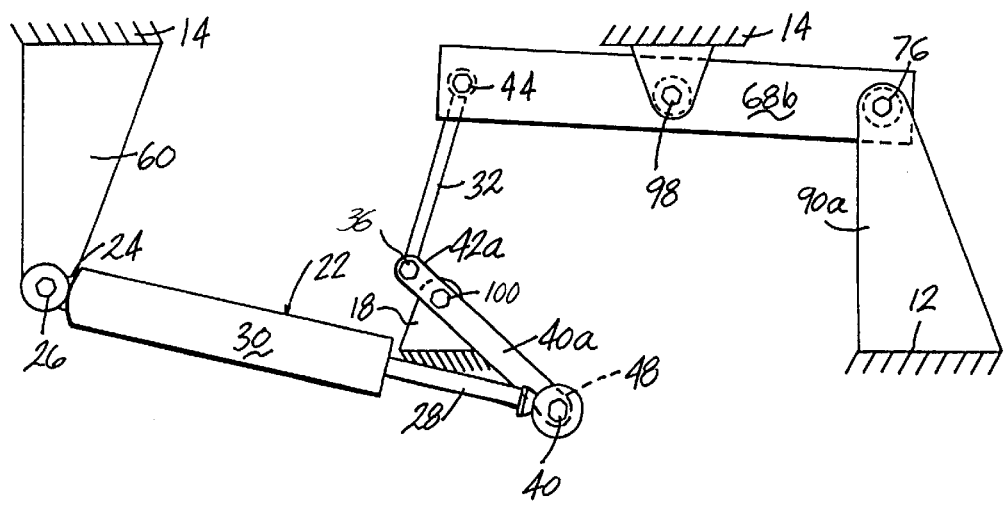
FIG. 25 is a schematic elevational view of a twenty-first embodiment of a vibration dampening assembly according to the invention.

Reference is now made to FIG. 25 which shows a twenty-first embodiment of the invention where like numerals have been used to designate like parts. The vibration dampening assembly illustrated in FIG. 25 is similar to the vibration dampening assembly illustrated in FIG. 24 except that the link member 32 is pivotably mounted to a first end 42a of the lever member 40a rather than at an intermediate point between the ends thereof. Similarly, the lever member 40a is pivotably connected at an intermediate point to the support plate through a pivot support 18 and a pivot pin 100. The vibration dampening assembly illustrated in FIG. 25 is shown displaced from a preferable equilibrium position wherein the longitudinal axis of the shock absorber 22 is parallel to the longitudinal axis of the lever member 40a. The operating characteristics of the vibration dampening assembly illustrated in FIG. 25 are believed to be substantially similar to the operating characteristics of the vibration dampening assembly illustrated in FIG. 24.

In the embodiments shown in FIGS. 15, 16, 17, 20, 21, 22 and 25, the lever member 40a is shown pivotably connected to the pivot support 18 and the link member 32 is shown connected to secondary lever 68b. It is within the scope of the invention to pivotably connect the end of link 32 to the pivot support 18 and to pivotably connect the lever 40a at a mid-portion to the secondary lever 68b, thereby interchanging the positions of link pivot pin 44 and main pivot 100, for example, in FIGS. 20, 21, 22 and 25.

The variable geometry dampening assemblies illustrated in FIGS. 11 and 13–20 incorporate a secondary lever in conjunction with a variant of the basic variable geometry dampening components. If the secondary lever is utilized as part of the suspension system, the secondary levers 68, 68a and 68b accomplish the following functions:

The secondary levers 68, 68a and 68b serve as a track bar to establish and maintain a lateral position of the cab (impact plate 14) with respect to the chassis (support plate 12).

The secondary levers 68, 68a, 68b serve to multiply the support capacity of the suspension components. One air spring is utilized in conjunction with the levers 68, 68a, 68b in place of the normal complement of two air springs.

In the embodiments illustrated in FIGS. 15–25, the variable geometry dampening assembly is mounted between the secondary lever 68b and the chassis (support plate 12). In this configuration, the variable geometry dampening mechanism experiences a vertical motion profile which is $$\frac{(p+q)}{q}$$

times larger than the cab/chassis relative motion wherein p is the linear distance between the link pivot pin 44 and the pivot pin 98 and q is the linear distance between the pivot pin 98 and the pivot pin 76 for the secondary lever 68b, as illustrated in FIG. 15. The increase in the variable geometry motion profile created by the introduction of the secondary lever simplifies the manufacturing process for the variable geometry dampening system. The lever "a" dimension, illustrated in FIG. 15, can be made relatively large. The "a" dimension is the linear separation distance between the axes of the main pivot pin 100 and the link pivot pin 36.

The resulting dampening force applied to the impact plate 14 or cab is larger than the resistance generated by the variable geometry system alone illustrated in FIGS. 1–10. The introduction of the secondary lever (68, 68a, 68b) has increased the effective dampening control force by the amount of $$\frac{(p+q)}{q}$$

(see FIG. 15).

It will be apparent from the foregoing description that the dampening assemblies described above produce very desirable force versus displacement characteristics, especially for use in a suspension between a truck cab and truck frame. However, there is sufficient spacing between the pivot axes of each of the dampening assemblies to avoid manufacturing difficulties resulting from lack of adequate spacing between pivot axes. Typically, the spacing between the main pivot and the lever/link pivot is larger than ¾" and this distance can be increased further depending upon the final design requirements. The vibration dampening assemblies according to the invention can be used with air or other types of springs that are positioned between the truck cab and the truck frame. Alternately, as illustrated in FIGS. 11 and 13–16, an air spring or any other type of spring can be incorporated into the vibration dampening assembly.

FIGS. 26–29 describe the twenty-second through twenty-fifth embodiments of the invention in which like numerals have been used to designate like parts. In the twenty-second embodiment of FIG. 26, one end 24 of the shock absorber 22 is mounted at pivot pin 26 to impact plate 14. An axially-extending resistance rod 28 at the opposite end of the shock absorber 22 is mounted to lever member 40a at shock pivot pin 50. An opposite end of the lever member 40a is mounted at main pivot pin 100 to an end 92 of track bar 68b. The opposite end of the track bar 68b is mounted to an upstanding pivot support 90a of the support plate 12 at pivot pin 76. Intermediate the pivot pin 76 and main pivot pin 100 along the track bar 68b, a pivot support 20 of the impact plate 14 is mounted to the track bar 68b at pivot pin 98. The above-described linkage mechanism is also mounted to the pivot support 18 through a link member 32 wherein a first end 34 is mounted to the pivot support 18 through pivot pin 36 and a second end 38 is pivotally mounted to the lever member 40a at pivot pin 44. The pivot pin 44 is preferably mounted to link member 40a intermediate the pivot pin 50 and main pivot pin 100 located at either end of the lever member 40a.

Figure 27:
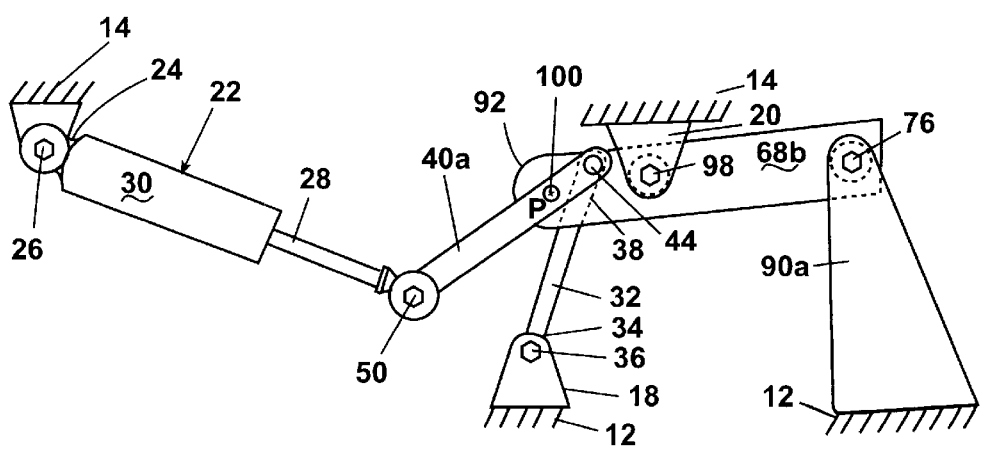
FIG. 27 is a schematic elevational view of a twenty-third embodiment of a vibration dampening assembly according to the invention.

With reference to the twenty-third embodiment of the vibration damping assembly according to the invention of FIG. 27, one end 24 of shock absorber 22 is pivotally mounted to the impact plate 14 at pivot pin 26. An axially-extending resistance rod located at the opposite end of the shock absorber 22 is pivotally mounted to a lever member 40a at pivot pin 50. An opposite end of the lever 40a is pivotally mounted at link pivot pin 44 to a distal end 38 of a link member 32. An opposite end 34 of the link member 32 is pivotally mounted to pivot support 18 of pivot pin 36. A main pivot pin 100 is provided intermediate the pivot pins 44 and 50 on the lever member 40a and, in turn, is pivotally mounted to an end 92 of track bar 68b. An opposite end of the track bar 68b is pivotally mounted to an upstanding pivot support 90 of the support plate 12 at pivot pin 76. Intermediate the main pivot pin 100 at one end 92 of the track bar 68b and the pivot pin 76 at the opposite end of the track bar 68b is a pivot pin 98 which pivotally mounts the track bar 68b to a pivot support 20 of the impact plate 14.

Figure 28:
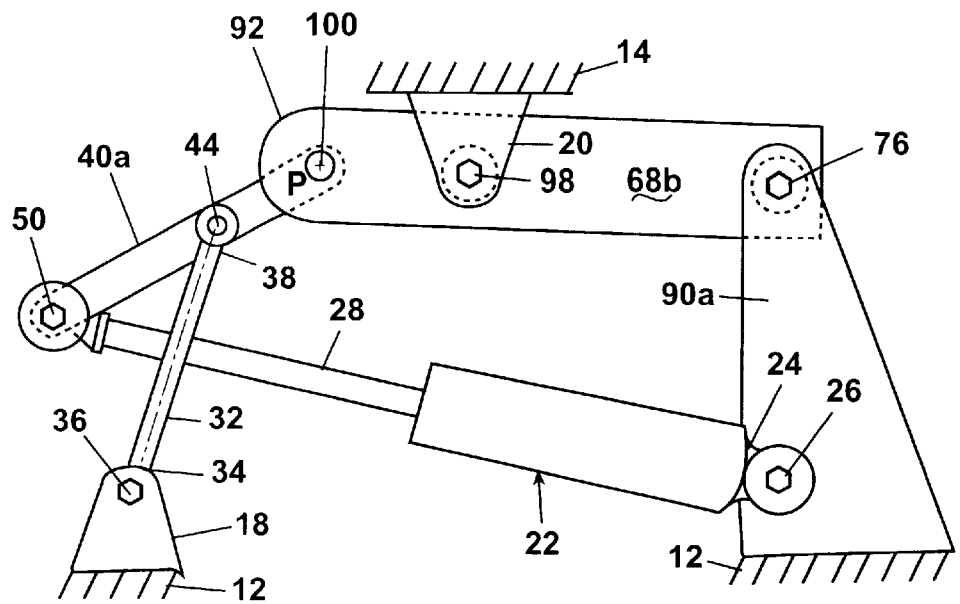
FIG. 28 is a schematic elevational view of a twenty-fourth embodiment of a vibration dampening assembly according to the invention.

With reference to the twenty-fourth embodiment of the vibration damping assembly according to the invention of FIG. 28, one end 24 of a shock absorber 22 is pivotally mounted adjacent a lower portion of an upstanding pivot support 90a of a support plate 12. An axially-extending resistance rod 28 located at an opposite end of the shock absorber 22 is pivotally mounted to one end of a lever member 40a at pivot pin 50. An opposite end of the lever member 40a is provided with a main pivot pin 100 which, in turn, is pivotally mounted to an end 92 of track bar 68b. The opposite end of track bar 68b is pivotally mounted to an upper portion of the upstanding pivot support 90a at pivot pin 76. A pivot support 20 for the impact plate 14 is pivotally mounted to the track bar 68b by a pivot pin 98 which extends through a pivot support 20 and the track bar 68b intermediate the pivot pins 76 and 100. Second end 38 of a link member 32 is pivotally mounted to lever member 40a intermediate the pivot pins 50 and 100 by pivot pin 44. A first end 34 of the link member 32 is pivotally mounted to pivot support 18 by pivot pin 36.

Figure 29:
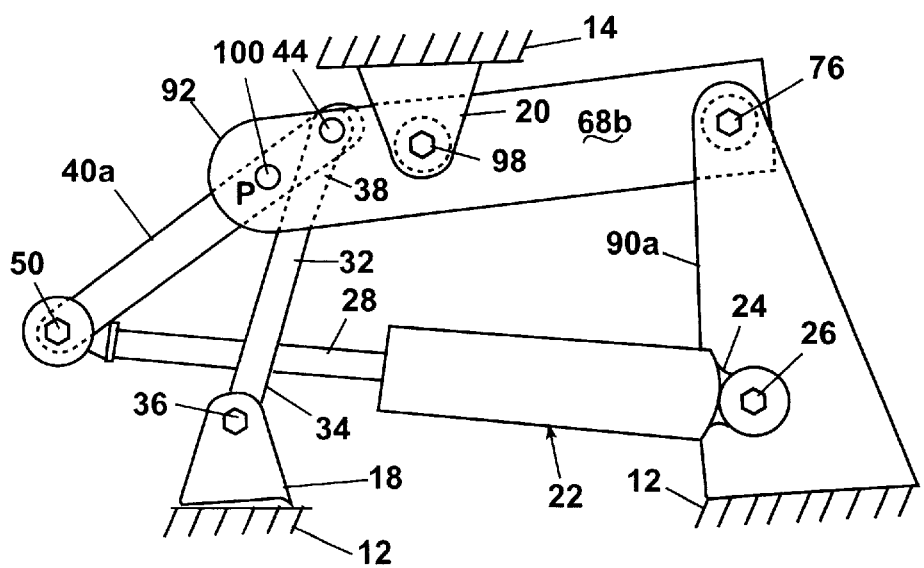
FIG. 29 is a schematic elevational view of a twenty-fifth embodiment of a vibration dampening assembly according to the invention.

With reference to the twenty-fifth embodiment of the vibration dampening assembly according to the invention of FIG. 29, one end 24 of a shock absorber 22 is pivotally mounted to a lower portion of an upstanding pivot support 90a by a pivot pin 26. A resistance rod 28 is provided at the opposite end of the shock absorber housing and has its distal end pivotally mounted to one end of a lever member 40a at pivot pin 50. An opposite end of a lever member 40a is pivotally mounted at 44 to one end 38 of a link member 32. An opposite end 34 of the link member 32 is pivotally mounted to the pivot support 18 by pivot pin 36. A main pivot pin 100 is provided intermediate the pivot pins 44 and 50 of the lever member 40a which, in turn, pivotally mounts one end 92 of a track bar 68b. An opposite end of the track bar 68b is pivotally mounted to an upper portion of an upstanding pivot support 90a of the support plate 12 by pivot pin 76. Intermediate the pivot pins 76 and 100 of the track bar 68b is provided a pivot pin 98 which pivotally mounts pivot support 20 of the impact plate 14 to the track bar 68b.

It can be seen from the embodiment shown in FIGS. 26–29 that the lever member 40a "floats", i.e., the lever member 40a is not mounted directly to any of the support plate 12 or impact plate 14 but floats between the two. Moreover, the addition of the floating lever member 40a, which includes the main pivot pin 100 in the embodiments shown in FIGS. 26–29, reduces the overall vertical height requirements of the vibration dampening assembly relative to other embodiments described above and which incorporate the track bar lever 68. The floating lever member 40a also provides greater flexibility and ease of manufacturing assembly of the vibration dampening assembly because of the assembly of the pivot pins to the lever member 40a can be accomplished without the lever member 40a bound to one of the fixed support plate 12 or the impact plate 14.

Figure 26:
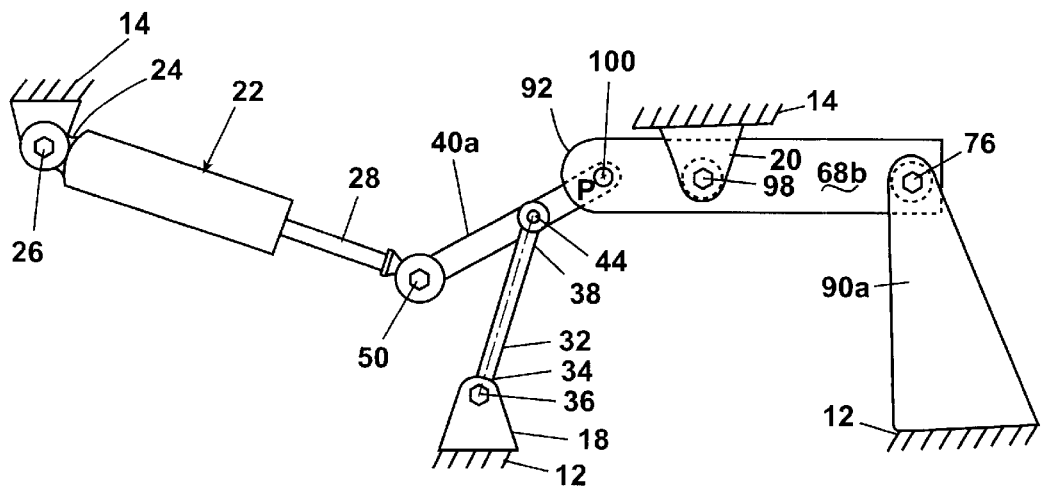
FIG. 26 is a schematic elevational view of a twenty-second embodiment of a vibration dampening assembly according to the invention.

Further, as can be seen from FIGS. 26 and 27, the shock absorber 22 acts in tension relative to the lever member 40a in that the resistance rod is generally retracted until appropriate vibration causes the resistance rod to extend. Conversely, in the embodiment shown in FIGS. 28–29, the shock absorber 22 is positioned generally in an extended state whereby vibrations encountered by the assembly cause the shock absorber 22 to compress and retract the resistance rod 28 within the shock absorber 22.

In the mechanical configurations in FIGS. 26 and 27, the shock absorber 22, track bar 68b, link 32, and lever 40a all lie essentially in a "common" operating plane, which greatly reduces the mechanical alignment difficulties during installation.

The invention has been described schematically with reference to the drawings. The actual linkages may be more complex linkages and include universal joints as shown in FIGS. 16 and 17. Other suitable universal joint linkages which can be used for the linkages shown schematically in the drawings are disclosed in International Application PCT/US97/17625 which is incorporated herein by reference.

Reasonable variation and modification are possible within the scope of the foregoing disclosure and drawings without departing from the spirit of the invention.

The embodiments for which an exclusive property or privilege is claimed are defined as follows:

1. A vibration dampening assembly for mounting between a suspended body and a supporting body, comprising:
    (a) a first plate (14) adapted for mounting to one of said suspended body or supporting body;
    (b) a second plate (12) adapted for mounting to the other of said suspended body or supporting body;
    (c) a first lever member (40a) having a longitudinal axis and first and second ends;
    (d) a shock absorber (22) having a central axis and first and second ends, said first end of said shock absorber is pivotally interconnected with said first lever member second end at a shock pivot (50), and said second end of said shock absorber is pivotally interconnected with said first plate (14) or said second plate (12) at a second support pivot (26);
    (e) a second lever member (68b) pivotally interconnected with said first plate (14) at a first lever pivot (98) and pivotally interconnected with said second plate (12) at a second lever pivot (76) spaced from said first lever pivot (98);
    (f) said first lever member (40a) first end is pivotally interconnected with one of the second plate (12) or the second lever (68b) at a first support pivot (100) spaced from said second support pivot (26); and
    (g) a link member (32) having first and second ends, said first end pivotally interconnected with the other of said second lever member and said second plate (12) at a link support pivot (36) and pivotally interconnected to said first lever member (40a) intermediate said first support pivot (100) and said shock pivot (50).

2. A vibration dampening assembly according to claim 1 wherein said first support pivot connection (100) also lies on the first lever member longitudinal axis.

3. A vibration dampening assembly according to claim 1 wherein the pivotal interconnection between the link member (32) and the first lever member (40a) lies on the first lever member longitudinal axis.

4. A vibration dampening assembly according to claim 1 and further comprising an air spring (80) mounted at one end to the first plate (14) and at another end to said second lever member (68b) at a distance spaced from said first lever pivot.

5. A vibration dampening assembly according to claim 4 wherein said first lever pivot (98) is positioned on said second lever member (68b) intermediate said second lever pivot (76) and said first support pivot (100).

6. A vibration dampening assembly according to claim 1 wherein said first lever pivot (98) is positioned on said second lever member (686) intermediate said second lever pivot (76) and said first support pivot (100).

7. A vibration dampening assembly for mounting between a suspended body and a supporting body, comprising:
   (a) a first plate (14) adapted for mounting to one of said suspended body or supporting body;
   (b) a second plate (12) adapted for mounting to the other of said suspended body or supporting body;
   (c) a link member (32) having first and second ends,
   (d) a first lever member (40a) having a longitudinal axis and first and second ends, said first lever member first end is pivotally interconnected with one of a second lever member (68b) at a first support pivot (100) or said first end of link member (32);
   (e) said second lever member (68b) is pivotally interconnected with said first plate (14) at a first lever pivot (98) and pivotally interconnected with said second plate (12) at a second lever pivot laterally spaced from said first lever pivot (98);
   (f) a shock absorber (22) having a central axis and first and second ends, said first end of said shock absorber is pivotally interconnected with said first lever member second end at a shock pivot (50), said second end (24) of said shock absorber (22) is pivotally interconnected with said first plate (12) or said second plate (14) at a second support pivot (26);
   (g) said link member (32) is pivotally interconnected to said first lever member (40a) intermediate said first support pivot (100) and said shock pivot (50), said first end (34) of said link member (32) is pivotally interconnected with the other of said first plate (12) or said second plate (14) at a link support pivot (36) which is laterally spaced from said second support pivot (26).

8. A vibration dampening assembly according to claim 7 and further comprising an air spring (80) mounted between the first plate (14) and the second lever (68b) member.

9. A vibration dampening assembly according to claim 8 wherein the first support pivot (46) and the second lever pivot (74) are intermediate the air spring (80) and the first lever pivot (76).

10. A vibration dampening assembly according to claim 1 wherein the first lever member (40a) first end is pivotally interconnected with the second lever (68b) at the first support pivot (100) and the link member (32) first end is pivotally interconnected with the second plate (12) at the link support pivot (34).

11. A vibration dampening assembly according to claim 1 wherein the first lever member (40a) first end is pivotally interconnected with the second plate (12) at the first support pivot and the link member (32) first end is pivotally interconnected with the second lever (68b) at the link support pivot.

12. A vibration dampening assembly according to claim 7 wherein said pivot connection between said link member (32) and said first lever member (40a) and said first support pivot (100) and said shock pivot (50) all lie on the first lever member longitudinal axis.

13. A vibration dampening assembly according to claim 1 wherein the link pivot connection between said link member (32) and said first lever member (40a), and said first support pivot (100) and said shock pivot (50) all lie on the lever member longitudinal axis.

14. A vibration dampening assembly according to claim 7 wherein the second end of the shock absorber (22) is pivotally connected to the second plate (12) at the second support pivot and the link member (32) is pivotally interconnected to the first plate (14) at the link support pivot.

15. A vibration dampening assembly according to claim 7 wherein the second end of the shock absorber 22) is pivotally connected to the first plate (14) at the second support pivot (26) and the link member (32) is pivotally interconnected to the second plate (12) at the link support pivot (36).

* * * * *